US012126171B1

(12) United States Patent
Chiluvuri et al.

(10) Patent No.: US 12,126,171 B1
(45) Date of Patent: Oct. 22, 2024

(54) SYNCHRONOUS VOLTAGE SIGNATURE DATA COLLECTION APPARATUS

(71) Applicant: Amazon Technologies, Inc., Seattle, WA (US)

(72) Inventors: Nayana Teja Chiluvuri, Seattle, WA (US); Chang Hwa Rob Yang, Sammamish, WA (US); Xunwei Yu, Kirkland, WA (US); Kenneth Lawrence Staton, San Carlos, CA (US); Cameron Dean Whitehouse, Seattle, WA (US); Matthew L. Chaboud, San Francisco, CA (US); Sajesh Kumar Saran, Bothell, WA (US); Pushkaraksha Gejji, San Jose, CA (US); Krzysztof Marcin Walczak, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/116,487

(22) Filed: Dec. 9, 2020

(51) Int. Cl.
*H02J 13/00* (2006.01)
*G06Q 50/06* (2012.01)
*H02J 3/14* (2006.01)

(52) U.S. Cl.
CPC .............. *H02J 3/14* (2013.01); *G06Q 50/06* (2013.01); *H02J 13/00017* (2020.01)

(58) Field of Classification Search
CPC ....... H02J 3/14; H02J 13/00017; G06Q 50/06
USPC .......................................................... 307/24
See application file for complete search history.

(56) References Cited

U.S. PATENT DOCUMENTS

| | | | |
|---|---|---|---|
| 5,689,816 A | 11/1997 | Lee et al. | |
| 10,320,407 B1 | 6/2019 | Kamath | |
| 2006/0227026 A1* | 10/2006 | Kadota | H03M 1/1038 341/120 |
| 2007/0057680 A1* | 3/2007 | Jones | G01N 27/028 324/607 |
| 2009/0222148 A1* | 9/2009 | Knotts | G05D 1/0038 701/2 |
| 2009/0228224 A1* | 9/2009 | Spanier | G01R 19/00 702/188 |
| 2010/0164768 A1 | 7/2010 | Mitikiri et al. | |
| 2013/0275066 A1* | 10/2013 | Spanier | G01R 21/133 702/61 |
| 2014/0354266 A1 | 12/2014 | Hurwitz et al. | |
| 2015/0185262 A1* | 7/2015 | Song | G06N 20/10 702/64 |

(Continued)

OTHER PUBLICATIONS

Dangerous DSO Part 3: Messing with the front-end; May 11, 2011; http://dangerousprototypes.com/blog/2011/05/11/dangerous-dso-part-3-messing-with-the-front-end/; retrieved by Examiner Feb. 23, 2022.

*Primary Examiner* — Richard Tan
(74) *Attorney, Agent, or Firm* — Athorus, PLLC

(57) ABSTRACT

Described is an apparatus to concurrently measure multiple input voltages at a high sampling data rate, such as at least two mega-samples per second. The apparatus may include a plurality of voltage data acquisition components that concurrently sample different input voltages and produce respective voltage data samples. Each of the plurality of voltage data acquisition components may be directly coupled to a field programmable gate array that receives the voltage data samples, packetizes those voltage data samples, and provide the packetized voltage data samples to a system on chip.

25 Claims, 16 Drawing Sheets

(56) References Cited

U.S. PATENT DOCUMENTS

| | | |
|---|---|---|
| 2016/0018447 A1 | 1/2016 | Nys et al. |
| 2016/0248436 A1* | 8/2016 | Watanabe ........... H03M 1/1295 |
| 2016/0259035 A1 | 9/2016 | Pandey et al. |
| 2016/0274168 A1 | 9/2016 | Cabot et al. |
| 2016/0274176 A1* | 9/2016 | Di Stefano ........ G01R 31/1272 |
| 2016/0285872 A1* | 9/2016 | Polar ....................... H04L 51/36 |
| 2018/0055409 A1 | 3/2018 | Xu |
| 2021/0333310 A1 | 10/2021 | Nag et al. |

* cited by examiner

SYNCHRONOUS VOLTAGE SIGNATURE DATA COLLECTION APPARATUS

BACKGROUND

People typically use power supplied from power systems, provided using power grids, to light buildings, to heat and cool homes, to enable operation of devices (computers, televisions, kitchen devices, etc.). There is a price for power.

As homes and other premises become more autonomous and more connected, attempts have been made to monitor and/or control the amount of energy consumed by various devices at those premises. However, existing monitoring systems require direct installation into the electrical panel of the premises and/or direct connection to a service main at the premises. In addition, many require dedicated breaker panels for operation.

BRIEF DESCRIPTION OF DRAWINGS

The detailed description is described with reference to the accompanying figures.

DETAILED DESCRIPTION

Figure 1A:
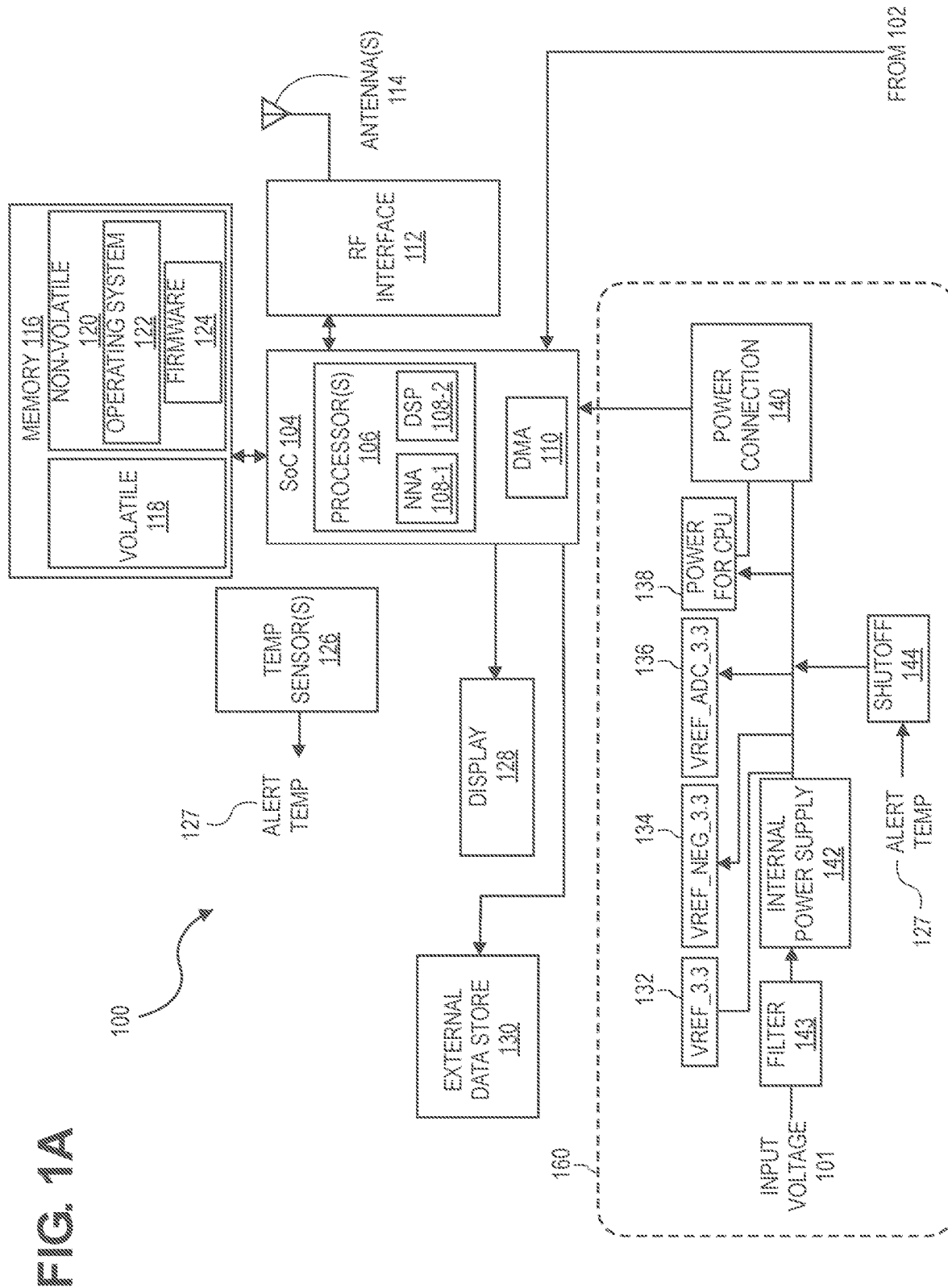
FIGS. 1A-1B are a diagram of a synchronous voltage signature data collection apparatus, in accordance with described implementations.

Described are systems, methods, and apparatus that synchronously and/or substantially simultaneously sample multiple input voltages and produce voltage data samples. The apparatus includes a field programmable gate array ("FPGA") that is directly coupled to a plurality of analog to digital converters ("ADC"), one connection for each ADC. Each ADC, through a respective voltage data acquisition component chain ("VDA component chain"), generates voltage data samples representative of a respective input voltage connected to the VDA component chain. The FPGA provides signaling to each of the ADCs that cause the ADCs to substantially simultaneously measure the input voltages and generate respective voltage data samples that are provided to the FPGA via the direction connection between each ADC and the FPGA. The FPGA also packetizes the received voltage data samples and sends the voltage data samples to a system on chip ("SoC") that stores and/or processes the received voltage data samples in a memory. In some implementations, the ADCs may each be 14-bit ADCs with a sampling rate of at least two mega-samples per second. In other implementations, the ADCs may have different sample sizes and/or sampling rates.

As discussed further below, the described implementations provide a technological improvement over existing systems by increasing the bandwidth of interest by increasing the substantially simultaneous sampling rate of the apparatus. For example, existing multi-serial peripheral interface ("SPI") buses used to communicate with ADCs are limited to a 60 mega-bits per second transmission rate. However, to concurrently sample multiple ADCs, such as three or more ADCs, the required transmission rate is higher than 60 mega-bits per second. Accordingly, with existing systems, to sample input voltages with multiple ADCs, each ADC must be sampled sequentially rather than substantially simultaneously, thereby losing the synchronization between the samples.

The disclosed implementations resolve this limitation of existing systems and allow synchronous sampling of any number of ADCs through use of an intermediary FPGA that is directly coupled to each ADC. The FPGA provides signaling to each of the ADCs that cause the ADCs to synchronously generate voltage data samples that are then sent to the FPGA via each dedicated data lane. The FPGA packetizes the received voltage data samples and sends them to the SoC through a high-speed interface, such as, but not limited to, a high-speed universal serial bus ("USB") interface between the FPGA and the SoC. The SoC stores the received voltage data samples in a memory, such as in a memory of the SoC and/or in an external memory that is coupled to the SoC. In addition, as discussed further below, the SoC may process the received voltage data to determine voltage signatures represented in the voltage data, to determine devices, device types, and/or device states that caused the voltage signatures, and/or send the data to one or more remote computing systems for processing.

In some implementations, the disclosed apparatus may be included in a plug-in energy sensor, as discussed further below, that may be inserted directly into an electrical outlet of an electrical circuit, such as an electrical circuit of a home, office, or other building (generally referred to herein as "premises"). The plug-in energy sensory, through use of the disclosed implementations, may monitor potential voltage at a premises to determine device usage at the premises. In comparison to existing systems that require installation into a breaker panel or directly to the mains to measure voltage, the disclosed plug-in energy sensor may be plugged directly into any electrical outlet at the premises and measure deviation in voltage at the premises in response to operation or change in state of a device.

Once plugged into an electrical outlet, the disclosed implementations may be used to synchronously monitor one or more of the hot wire with respect to ground, the neutral wire with respect to ground, and/or the hot wire with respect to the neutral wire for changes in potential voltage at the premises. For example, when a device at the premises is turned on, the device generates voltage that is introduced into the voltage signal at the premises and detectable by the plug-in energy sensor. Different devices generate different patterns or signatures of voltage as they operate, also referred to herein as voltage signature data, thereby making the voltage signatures unique, or almost unique, to different device types, device elements of a device (e.g., motor, magnetron, heating element, etc.) and/or different devices. For example, the voltage pattern (voltage signature data) introduced by operation of a microwave is very different than the voltage signature of a washing machine. By monitoring for voltage signature data on different inputs, also referred to herein as channels, operation of devices at the premises can be determined, along with start times and stop times of those operations associated with the various devices.

Utilizing voltage monitoring and device identification from a plug-in energy sensor that can be incorporated into the electrical system by simply plugging the plug-in energy sensor into any electrical outlet in conjunction with energy consumption data for the premises provides an improvement over existing energy monitoring systems. For example, the disclosed implementations may be installed by any consumer and do not require professional installation, connection directly to the breaker box and/or electrical mains, and do not consume one or more breaker slots on the breaker box panel. Still further, by monitoring for changes in voltage, rather than or in addition to current, additional information and data may be obtained for devices at the premises.

In some implementations, the voltage signature data determined by the plug-in energy sensor, along with the start time and stop time corresponding to each detected voltage signature and respective state of the device, is provided to a remote computing system, referred to herein as a management system. The management system maintains premises profiles for each premises, user profiles for users at or associated with the various premises, and may also receive third party data, such as energy consumption information for the premises, weather patterns, power system load, expected energy consumption information for devices, device signals, etc. The premises profiles may identify characteristics about each premises, identification of devices at the premises, voltage signature data for those devices, and/or different states for those devices, the size of a structure at the premises, identification of users that occupy the premises, the orientation of the premises, the altitude of the premises, etc.

In some implementations, the management system may process the voltage signature data to identify the device and/or the device state of a device that generated the voltage signature data. In other implementations, device identification may be done by the plug-in energy sensor. In still other implementations, the plug-in energy sensor may store voltage signature data for previously identified devices at the premises and, if a detected voltage signature data matches one of the stored voltage signature data, the plug-in energy sensor may identify the device and/or the device state of the device. However, if a detected voltage signature data does not match a stored voltage signature data, the detected voltage signature data may be transmitted from the plug-in energy sensor to the remote management system for additional analysis. The remote management system may compare the received voltage signature data with a larger data set of voltage signature data to determine a device type, a device of the device type, an element of the device, and/or a device state of the device. Once identified, the voltage signature data and the device identification and/or device state identification may be provided to the plug-in energy sensor and used in the future by the plug-in energy sensor to identify the device and/or the device state.

Figure 1B:
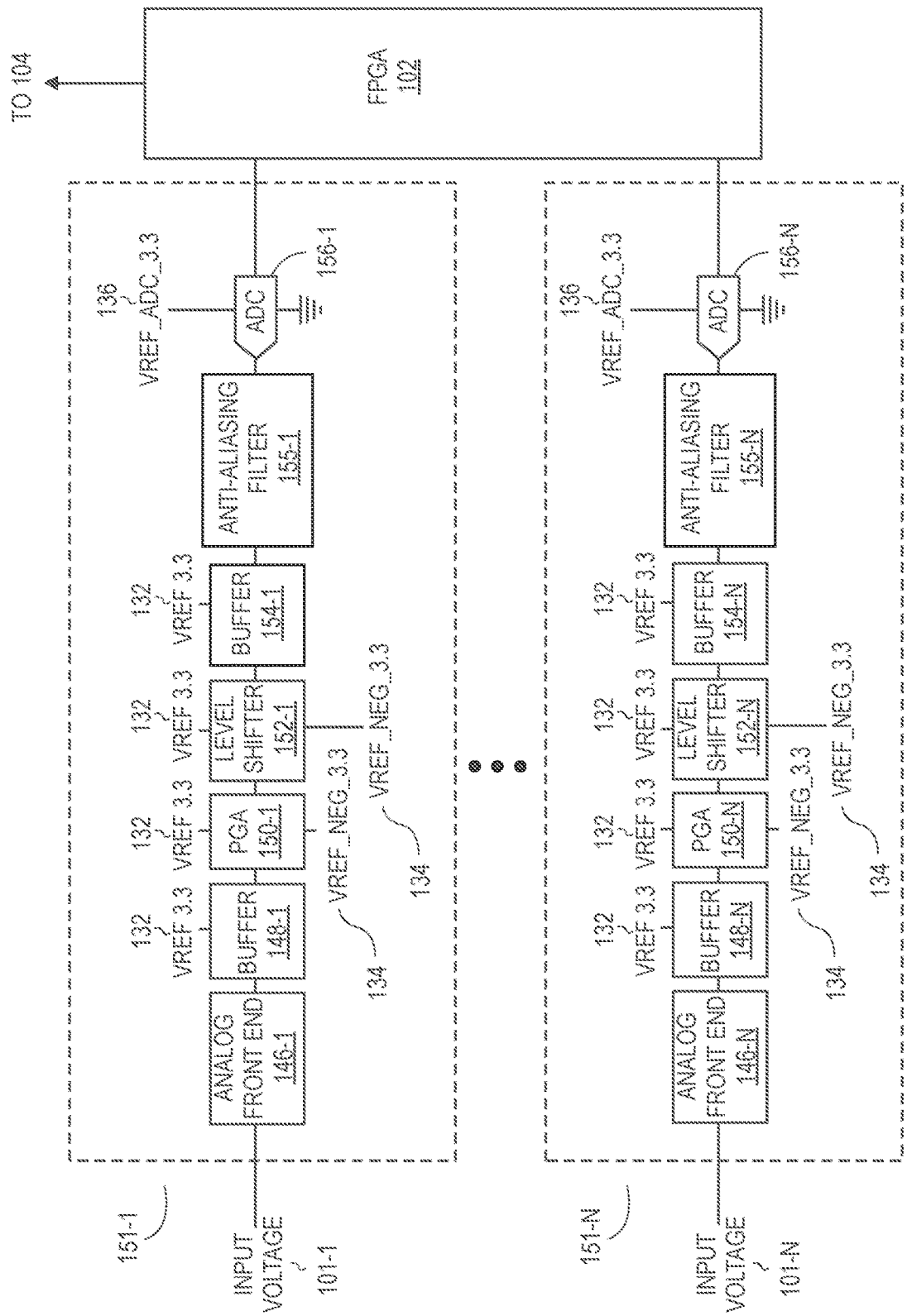

FIGS. 1A-1B are a diagram of a synchronous voltage signature data collection apparatus 100, in accordance with described implementations. As discussed, in some implementations, the synchronous voltage signature data collection apparatus 100 may be or may not be included in a plug-in energy sensor. The synchronous voltage signature data collection apparatus 100 may be configured to allow substantially simultaneous sampling of multiple input voltages, such as substantially simultaneous sampling of a hot wire of an electrical circuit with respect to ground as a first input voltage, a neutral wire of the electrical circuit with respect to ground as a second input voltage, and the hot wire with respect to the neutral wire as a third input voltage. In addition, the disclosed implementations provide a bandwidth of one mega-hertz or higher by enabling a sampling rate of two mega-samples per second, or more.

Referring first to FIG. 1B, the synchronous voltage signature data collection apparatus 100 includes any number of voltage data acquisition component chains ("VDA component chain") 151-1 through 151-N, each of which are directly coupled to a field programmable gate array ("FPGA") 102 to enable substantially simultaneous sampling of different input voltages 101-1 through 101-N and transmission of sampled voltage data from each VDA component chain.

As discussed further below, each VDA component chain 151 may include an analog front end 146-1/146-N, a first buffer 148-1/148-N, a programmable gain amplifier ("PGA") 150-1/150-N, a level shifter 152-2/152-N, a second buffer 154-1/154-N, an anti-aliasing filter 155-1/155-N, and an ADC 156-1/156-N.

The FPGA 102 is coupled to each ADC 156-1/156-N via a direct connection to enable synchronous sampling and data transmission by each ADC 156-1/156-N. Likewise, the FPGA is connected to a SoC 104, as illustrated in FIG. 1A. As discussed further below, the SoC 104 may include one or more processors 108, such as a neural network accelerator 108-1, a digital signal processor 108-2, etc. Likewise, the SoC may also include a direct memory access ("DMA") chip 110. The SoC 104 may be coupled to a radio frequency ("RF") interface 112 to enable wireless data exchange between the SoC 104 and other device, such as a wireless network access point, a server, etc. The RF interface 112 may include one or more antennas 114 and support any form of wireless communication such as BLUETOOTH, Near Field Communication, Wi-Fi, cellular, etc.

In some implementations, the SoC 104 may also be coupled to or include a memory 116 which may include volatile memory 118 and/or non-volatile memory 120. For example, the non-volatile memory may store an operating system 122, firmware 124, program instructions that are executed by the one or more processors 108, etc. Volatile memory 118 may be used as a register to store voltage data samples received from the FPGA 102, which may be directly accessed by the DMA 110, without the need for system resources from the one or more processors 108.

In some implementations, the SoC may also be detachably connected to one or more external data stores 130. In such a configuration, voltage data samples may be stored on the external data store 130 in addition to or as an alternative to storing the data samples in memory 116.

A display 128, such as one or more lights, a monitor, etc., may also be coupled to the SoC 104 to provide operational information to an operator. Still further, a temperature sensor 126 may also be connected to the SoC to monitor an operating temperature of the SoC and/or other components connected to or in which the synchronous voltage signature data collection apparatus 100 is included. If a measured temperature exceeds a defined value, the temperature sensor 126 may generate an alert temperature notification 127 that is received by a power shutoff 144. The power shutoff 144, in response to receiving an alert temperature notification 127 will interrupt power supplied to the synchronous voltage signature data collection apparatus 100.

Finally, the synchronous voltage signature data collection apparatus 100 may also include a power distribution unit 160 that receives power from the internal power supply 142 at a power connection 140 from an electrical outlet or other power source to which the synchronous voltage signature data collection apparatus 100 is connected. In some implementations, a filter 143 may be included between the input voltage 101 and the internal power supply 142 to filter out any voltage signature data from appliances, including the apparatus 100, that are connected to the electrical circuit. The filter 143 may be used to filter out any noise the apparatus 100 may introduce back into the electrical circuit to which it is connected, as well as any other noise present on the electrical circuit. Likewise, the filter 143 may be configured to satisfy one or more conducted emission regulatory or compliance requirements. The filter may be any of a variety of filters such as a common-mode choke ("CMC") filter, a combination of a CMC filter and an X-cap filter, a Y-cap filter, and/or a differential-mode choke filter.

As illustrated, the filter 143 may be connected between the electrical circuit and the internal power supply 142. The filter 143 is not connected between the electrical circuit and the VDA component chains.

In some implementations, the power connection 140 provides power to the SoC 104, generates low power reference voltages, such as a positive 3.3 volt reference voltage 132 (VREF_3.3), a negative 3.3 volt reference voltage 134 (VREF_NEG_3.3), an ADC 3.3 volt reference voltage 136 (VREF_ADC_3.3), and may also provide processor power 138 to the one or more processors 108. The internal power supply 142 may also provide power to one or more other components of the apparatus, such as the FPGA 102. Referring briefly back to FIG. 1B, the positive reference voltage 132 may be provided to each of the first buffer 148, PGA 150, level shifter 152, and the second buffer 154 of each VDA component chain 151 of the synchronous voltage signature data collection apparatus 100. Likewise, the negative reference voltage 134 may be provided to each of the PGA 150 and level shifter 152 of each VDA component chain 151 of the synchronous voltage signature data collection apparatus 100. Similarly, the ADC reference voltage 136 may be provided to each ADC 156 of each VDA component chain 151 of the synchronous voltage signature data collection apparatus 100.

Figure 2:
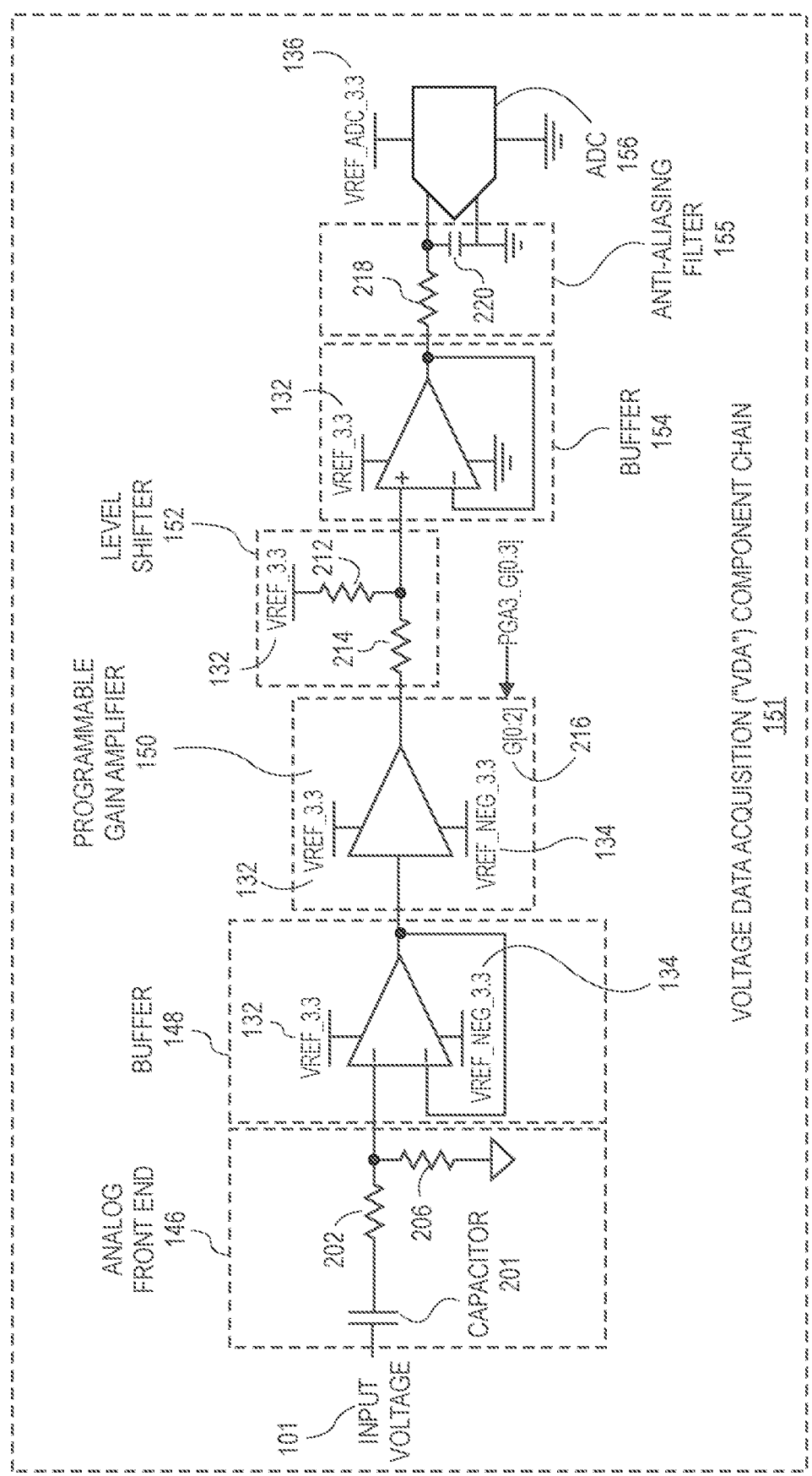
FIG. 2 is a diagram of a voltage data acquisition component chain of the synchronous voltage signature data collection apparatus, in accordance with described implementations.

FIG. 2 is a diagram of a voltage data acquisition component chain 151 of the synchronous voltage signature data collection apparatus 100 illustrated in FIGS. 1A-1B, in accordance with described implementations.

As discussed above, each VDA component chain 151 may include an analog front end 146, a first buffer 148, a PGA 150, a level shifter 152, a second buffer 154, and an ADC 156. The analog front end 146 may be configured to step down the input voltage 101 to a resolution voltage of the ADC 156. For example, the ADC may have a reference voltage of 3.3 volts. If the input voltages range between positive and negative 120 volts, the analog front end may be configured to step-down or attenuate the input voltage from 120 volts to the reference voltage of 3.3 volts.

Traditional systems use a resistive divider to attenuate input signals. However, because a resistive divider causes a flat attenuation across the input, such a configuration attenuates the high frequency signatures included in the input signal, which may have a much lower amplitude. As a result, data at higher frequencies but with lower amplitudes that are indicative of device operation may be lost as a result of such an attenuation.

The disclosed implementations resolve this deficiency of traditional systems by adding a high pass filter that includes a capacitor 201 and resistors 202 and 206. The values of the capacitor 201 and resistors 202 and 206 may be set to determine the cutoff frequency for the high pass filter. For example, the capacitor may have a value of 150 picofarads ("pF") the resistor 202 may have a resistance of 750,000 Ohms, and the resistor 206 may have a resistance value of 150,000 Ohms. Such a configuration results in a cutoff frequency of 1.2 Kilohertz ("kHz") and results in an approximately a negative forty-seven decibel ("dB") attenuation at sixty Hertz ("Hz") and approximately a negative twenty-two dB attenuation at higher frequencies above the cutoff frequency. In other implementations, the capacitor and/or resistor values may be different and/or the cutoff frequency of the high pass filter may be higher or lower.

Figure 3:
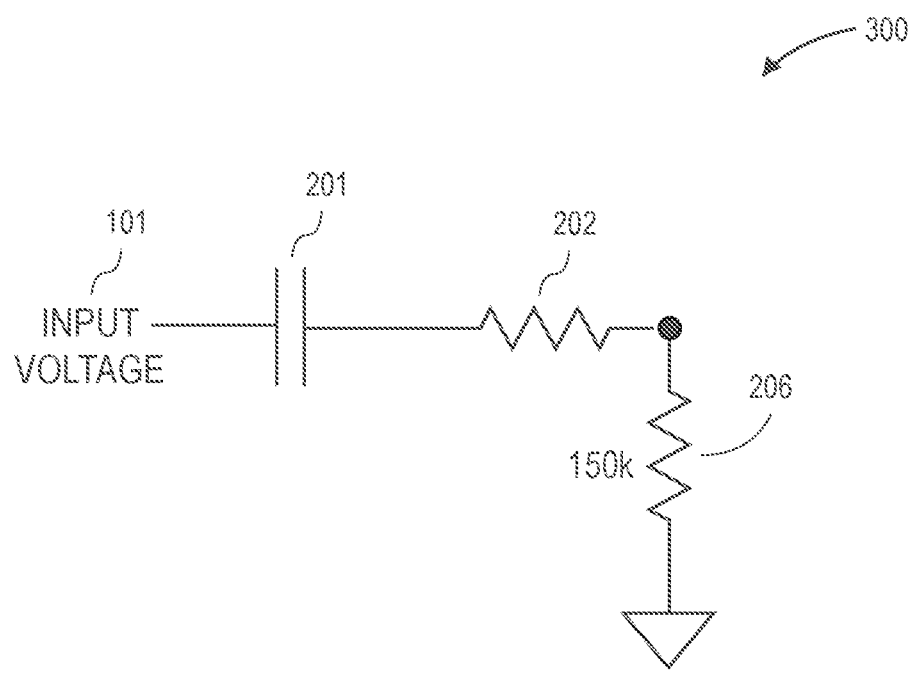
FIG. 3 is a diagram of a high-pass filter to satisfy Hi-Pot and surge requirements, in accordance with described implementations.

In addition, and referring to FIG. 3, the configuration of the high pass filter 300 included in the analog front end 300 satisfies the Hi-Pot requirements and surge requirements without causing isolation (relay or transformer) and without requiring a separate relay or transformer for isolation. In particular, with the capacitor voltage rating of 150 pF the Hi-Pot and surge requirements are satisfied and the total impedance of the analog front end 146 satisfies regulatory compliance requirements regarding current leakage to earth during normal operation of the apparatus. In particular, the capacitor 201 blocks direct current which enables the apparatus to satisfy the current Hi-Pot regulatory requirements. Likewise, the resistance power ratings of the analog front end satisfy the Hi-Pot and surge event requirements.

While the examples discussed herein refer to a high-pass filter included in the analog front end 146 of the VDA component chain(s) 151, in other implementations, other devices may be used instead of or in addition to the high-pass filter. For example, in some implementations, the analog front end 146 of one or more VDA component chains 151 of an apparatus may include a voltage divider. As will be appreciated, in some implementations, different VDA component chains of an apparatus may have different analog front end 146 configurations. For example, some of the analog front ends of VDA component chains 151 of an apparatus may include a high-pass filter and other analog front ends 146 of other VDA component chains 151 of the apparatus may include other filters, such as a voltage divider.

Returning to FIG. 2, the first buffer 148 is coupled to the output of the analog front end 146. The first buffer 148 may be an operational amplifier (op-amp) that separates the input impedance from the analog front end 146 to isolate and decouple the input impedance from the remainder of the VDA component chain. This separation is important because the impedance of the analog front end 146, without the first buffer 148, may be too high and not suitable to drive the remaining components of the VDA component chain 151. The first buffer 148 enables sampling the high-impedance input analog front end 146 and drive the remainder of the VDA component chain with a low output impedance.

Coupled to the output of the first buffer 148 is the PGA 150. The PGA 150 may be used to perform polarity detection and polarity swapping of the input voltage 101 that is stepped down by the analog front end 146. The PGA may be a multi-bit amplifier (e.g., 3-bit amplifier) with different gain settings. When the apparatus 100 is being used to substantially simultaneously measure the hot wire and neutral wire of an electrical circuit, once the VDA component chain connected to the hot wire is detected, the gain of the PGA 150 included in the VDA component chain connected to the neutral wire may be set by an input command 216 from the SoC to be a multiple of the hot channel, thereby keeping the neutral channel symmetric with respect to other channels being measured. For example, if the PGA 150 of the VDA component chain 151 connected to the hot channel is set to a gain of one, the PGA 150 of the VDA component chain 151 connected to the neutral channel may be set to a multiple of the hot channel, such as a gain of two. In addition, if a higher resolution on a channel is needed, the gain of the respective PGA 150 may be increased to further amplify the signal. An example process for determining the VDA component chain 151 connected to the hot wire is discussed further below with respect to FIG. 7.

The level shifter 152 is coupled to the output of the PGA 150 and is configured to shift the stepped down voltage from a positive and negative voltage range to just a positive voltage range. For example, if the stepped down voltage output from the analog front end 146 cycles between positive 3.3 volts and negative 3.3 volts, the resistors 212 and 214 may be set to resistance values that will divide the voltage by two and offset set the voltage so that it cycles between zero and positive 3.3 volts, with a center line of positive 1.65 volts. For example, the resistance values 212, 214 may each be 10,000 Ohms. In other implementations, the resistance values may be different.

The level shifter 152 may be optional depending on the configuration of the ADC. For example, if the ADC is a bipolar or differential ADC, the level shifter may be omitted from the VDA component chain 151. However, if the ADC 156 is a unipolar ADC, such as an ADC with a reference voltage between 0.0 and 3.3 volts, the level shifter 152 may be included to shift the stepped down input voltage such that voltage input to the ADC all has the same polarity.

The second buffer 154, which may be another op-amp, is coupled to the output of the level shifter, or the output of the PGA 150 if the level shifter is omitted. The second buffer drives the ADC 156.

Coupled between the second buffer 154 and the ADC 156 is an anti-aliasing filter 155. The anti-aliasing filter may include a resistor 218 in series between the output of the buffer 154 and an input to the ADC 156, and a capacitor 220. The anti-aliasing filter 155 contributes to the sampling rate of the ADC 156. In particular, based on the selection of the resistor 218 and the capacitor 220, along with the selected values of other components of the ADC, the bandwidth of the voltage signal received from the buffer 154 may be restricted to correspond to the bandwidth of interest to be sampled by the ADC 156.

Finally, each VDA component chain 151 includes an ADC 156 that receives the stepped down and optionally shifted voltage, converts the analog voltage signal to digital voltage data samples, and provides those voltage data samples to a connected FPGA 104, as discussed herein.

While the examples discussed herein primarily reference substantially simultaneous sampling of multiple input channels, such as substantially simultaneously sampling voltage data on a hot line (input channel) and a neutral line (input channel), in other implementations, the sampling may be synchronous but not necessarily substantially simultaneous. Likewise, while the disclosed implementations discuss the configuration of the VDA component chains including an ADC and the ADC being coupled to the FPGA, in other implementations, other sensors may be used instead of an ADC, with or without some or all of the other components of the VDA component chain. For example, in some implementations, multiple sensors may be coupled directly to an FPGA that operates as an intermediary between the multiple sensors and an SoC, with the FPGA controlling timing and sampling of the multiple sensors.

Figure 4:
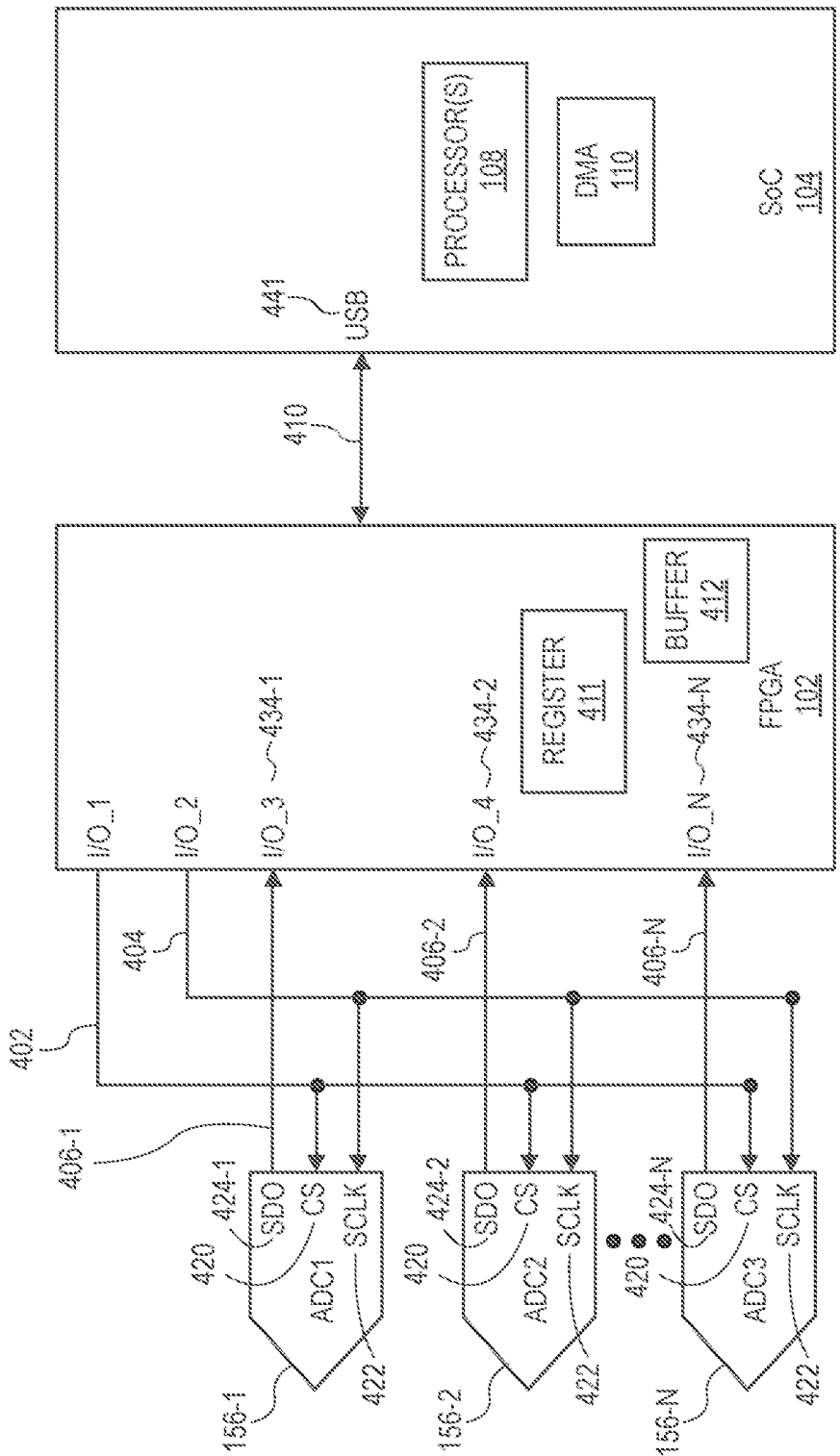
FIG. 4 is a diagram of a field programmable gate array and a System on Chip configured to synchronously receive voltage data from a plurality of analog to digital converters, in accordance with described implementations.

FIG. 4 is a diagram of a field programmable gate array and a System on Chip ("SoC") configured to synchronously receive voltage data from a plurality of analog to digital converters ("ADC") of a plurality of VDA component chains 151, in accordance with descried implementations.

Consumer grade ADCs typically include a SPI bus to transfer data from the ADC. Typical SPI busses are limited to a transmission rate of sixty mega-bits per second. However, use of three 14-bit ADCs sampling at two mega-samples per second requires approximately eighty-four mega-bits per second bandwidth for transmission, which is higher than traditional SPI busses can handle. As a result, with traditional systems, the only way to sample from three different 14-bit ADCs at two mega-samples per second is to sample each of them separately, which results in a loss of synchronization among the different voltage data samples.

To resolve this deficiency of traditional systems, the disclosed implementations include an FPGA 102 that is coupled directly to each of the ADCs of each VDA component chain. Multiple VDA component chains 151 may be included and directly coupled to the FPGA 102, thereby enabling substantially simultaneous voltage data sampling of multiple input voltages.

The FPGA 102 provides signaling to each of the ADCs instructing the ADCs when to sample, thereby ensuring substantially simultaneous sampling of the different input voltages 101 by the different VDA component chains 151. In addition, the FPGA 102 packetizes the synchronous voltage data samples and provides the packet of samples to the SoC 104. For example, the synchronous voltage data samples may be packaged by the FPGA 102 into a USB payload for transmission over a high-speed USB connection between the FPGA 102 and the SoC 104. Not only does use of USB between the FPGA 102 and the SoC 104 provide high speed data transfer between the FPGA 102 and the SoC 104, the SoC may include a direct memory access ("DMA") controller 110, which removes the need for the one or more processors 108 of the SoC to use cycles to read and store the received data in memory. Instead, the DMA will read and store the data directly into the appropriate memory storage, thereby reducing the workload of the one or more processors.

As illustrated, each ADC 156-1, 156-2, through 156-N includes a chip select interface 420, a system clock interface 422, and a data out interface 424, each of which are connected to the FPGA 102. As illustrated, each chip select interface 420 is connected to the same input/output ("I/O") interface of the FPGA 102 via a connection 402. Likewise, each system clock interface 422 is connected to the same I/O interface of the FPGA 102 via connection 404. In comparison, each data out interface 424 of each ADC 156 is connected to a separate I/O interface of the FPGA 102. For example, the data out interface 424-1 of ADC1 156-1 is directly connected to I/O_3 interface 434-1 of the FPGA 102 via connection 406-1, the data out interface 424-2 of ADC2 156-2 is directly connected to I/O_4 interface 434-2 of the FPGA 102 via connection 406-2, and the data out interface 424-N of ADCN 156-N is directly connected to I/O_N interface 434-N of the FPGA 102 via connection 406-N.

When the FPGA 102 triggers the chip select 420 through connection 402, each of the connected ADCs begin sampling the input voltages to which they are connected. Because the chip select 420 of each ADC is connected to the same I/O interface of the FPGA 102 via the same connection 402, each ADC receives the same notification to begin sampling.

When instructed to sample, each ADC samples the input voltage and each ADC transmits one bit of data to the FPGA 102 at each clock cycle of the system clock. As noted above, each ADC 156 receives from the FPGA the same clock cycle via line 404. Because each ADC 156 is instructed to sample at the same time and each ADC transmits one bit of data with each clock cycle, the samples generated and sent by each ADC to the FPGA 102 are synchronized.

The FPGA 102, upon receiving each of the data samples substantially simultaneously from each connected ADC, stores the data samples in an internal register 411, buffer 412, and/or other memory of the FPGA 102, and packetizes the samples for transmission to the SoC 104. With each clock cycle, additional bits of data are received from each ADC 156 and stored in the register/buffer 411/412 of the ADC until all bits of the data sample (e.g., 14 bits) are received for each data sample. By adjusting the clock cycle sent from the FPGA 102 to the connected ADCs 156, the sample rate can be increased or decreased. For example, in some implementations, the clock cycle may be set to a sampling rate of up to two mega samples per second. In other implementations, the sample rate may be higher or lower.

Transmission of data samples between the FPGA 102 and the SoC 104 may be continuous or periodic. In some implementations, data samples received at the FPGA 102 may be buffered and sent in batches from the FPGA 102 to the SoC 104. For example, between sixty and one-hundred data samples (or another defined amount) may be buffered at the FPGA 102 and, once the defined amount of samples have been received, the buffered samples may be packaged into a payload, such as a USB payload, and sent as a single transmission from the FPGA 102 to the SoC 104 via a connection 410 between the FPGA 102 and the SoC 104. In some implementations, the connection between the FPGA 102 and the SoC 104 may be a USB interface 441. In other implementations, other interface configurations may be used. As the data is received at the SoC 104, the DMA 110 controller of the SoC may store the received data into a memory block, without involvement of the one or more processors 108.

As discussed further below, the voltage data samples stored in memory may then be processed to determine device operation of one or more devices.

Figure 5:
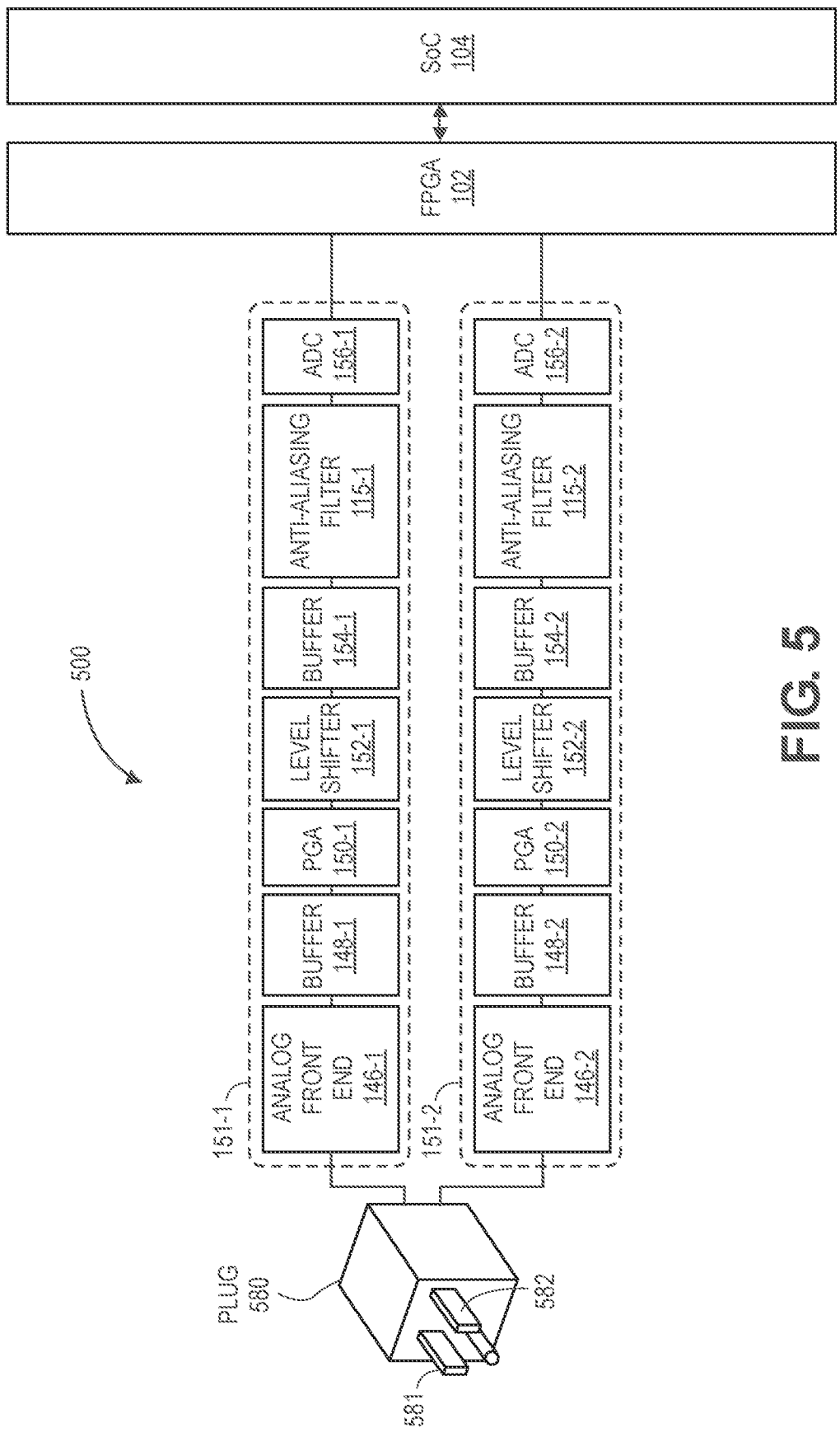
FIG. 5 is a block diagram of an example synchronous voltage signature data collection apparatus configured as a plug-in energy sensor, in accordance with described implementations.

FIG. 5 is a block diagram of an example synchronous voltage signature data collection apparatus 500 configured as a plug-in energy sensor, in accordance with described implementations.

In the illustrated example, the synchronous voltage signature data collection apparatus 500 includes two VDA component chains 151-1/151-2, each of which are directly coupled to an FPGA 102. Likewise, the FPGA is coupled to and provides voltage data samples received from the two VDA component chains 151-1/151-2 to the SoC 104, as discussed above.

The input of the first analog front end 146-1 of the first VDA component chain 151-1 of the synchronous voltage signature data collection apparatus 500 is connected to a first prong 581 of an electrical plug 580 that may inserted into a wall outlet of an electrical circuit at a premises. The input of the second analog front end 146-2 of the second VDA component chain 151-1 of the synchronous voltage signature data collection apparatus 500 is connected to a second prong 582 of the electrical plug 580 that may inserted into the wall outlet.

When the synchronous voltage signature data collection apparatus 500 is inserted into an outlet, voltage signature data is detected on each of the hot line and neutral line of the electrical circuit to which the electrical outlet is connected. As discussed above, the PGAs 150-1/150-2 will determine which VDA component chain is connected to the hot wire and which is connected to the neutral wire and adjust the gains accordingly. As discussed above, the synchronous voltage signature data collection apparatus 500 may be used to detect voltage changes at the premises.

Figure 6:
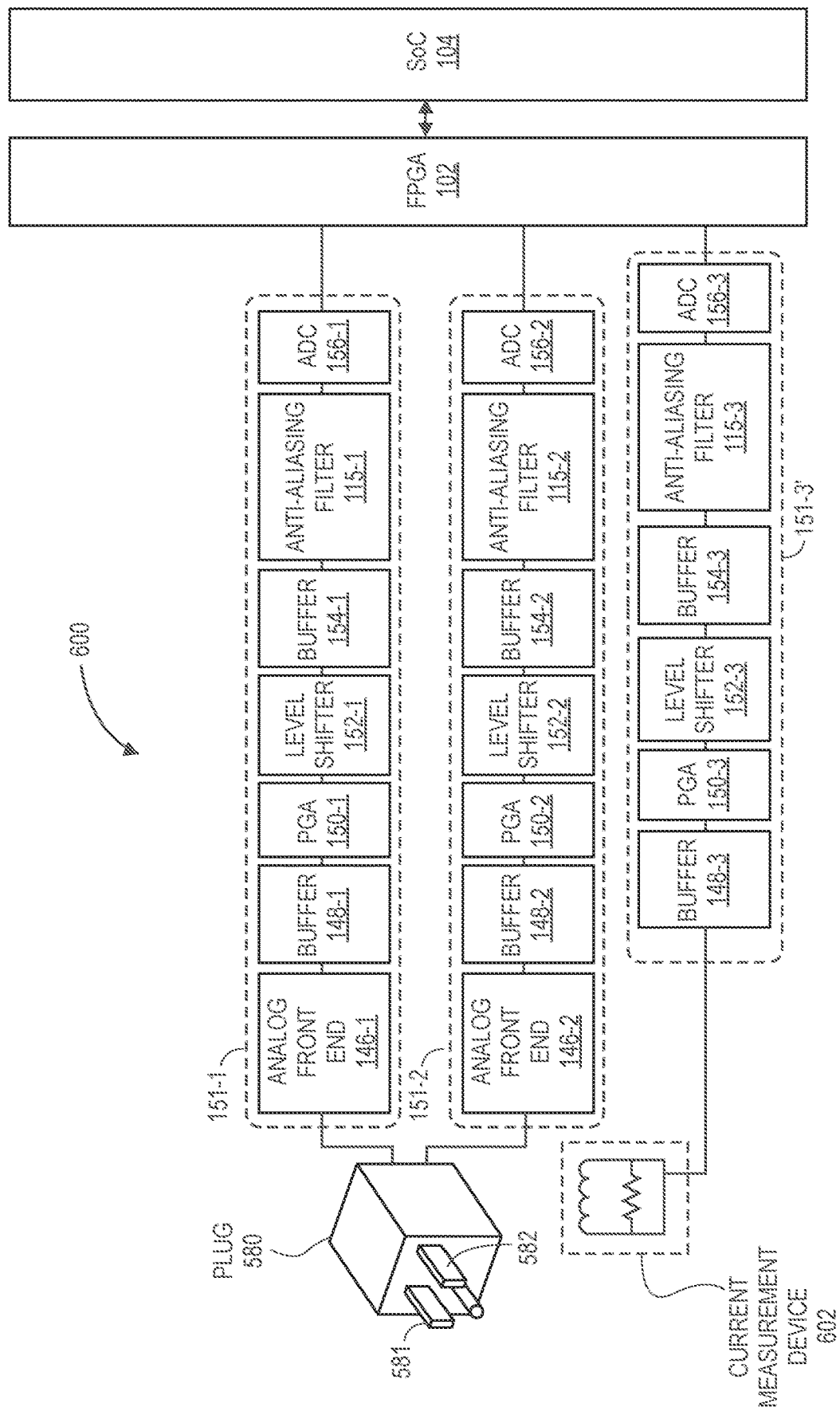
FIG. 6 is a block diagram of an example synchronous voltage signature data collection apparatus configured as a plug-in energy sensor that includes a current transformer to synchronously measure voltage signatures and current, in accordance with described implementations.

FIG. 6 is a block diagram of another example synchronous voltage signature data collection apparatus 600 configured as a plug-in energy sensor that includes a current measurement device 602, such as a current transformer, Hall sensor(s), etc., to synchronously measure voltage signatures and applied current, in accordance with described implementations.

Similar to the example discussed with respect to FIG. 5, the apparatus 600 includes two VDA component chains 151-1/151-2. The first VDA component chain 151-1 is connected to the first prong 581 and the second VDA component chain 151-2 is connected to the second prong 582 of the plug 580. In addition, the apparatus 600 includes a current measurement device 602 that may be used to measure current across either the hot wire or the neutral wire when the apparatus 600 is plugged into an outlet of an electrical circuit. For example, if the apparatus 600 is included in a plug-in sensor that includes one or more outlets to receive plugs from other devices, such as a power strip or surge protector, the current transformer may be used to measure current across the hot wire and/or neutral wire as the current passes through the plug-in sensor to another device connected to the plug-in sensor that includes the apparatus 600.

In comparison to the VDA 151-1/151-2, the VDA 151-3' to which the current transformer is coupled, does not include an analog front end. In comparison, the current measurement device 602 is coupled to the first buffer 148-3. However, similar to the first VDA component chain 151-1 and the second VDA component chain 151-2, the third VDA component chain 151-3' is also connected directly to the FPGA 102 and samples the current and produces current data samples substantially simultaneously with the voltage data samples generated by the first VDA component chain 151-1 and the second VDA component chains 151-2 of the apparatus 600.

By measuring the current, the apparatus 600 may use both voltage data samples substantially simultaneously collected by the first VDA component chain 151-1 and the second VDA component chain 151-2 and the current sampled by the third VDA component chain 151-3', which is also measured substantially simultaneously with the voltage samples to determine device that are operating at the premises.

Figure 7:
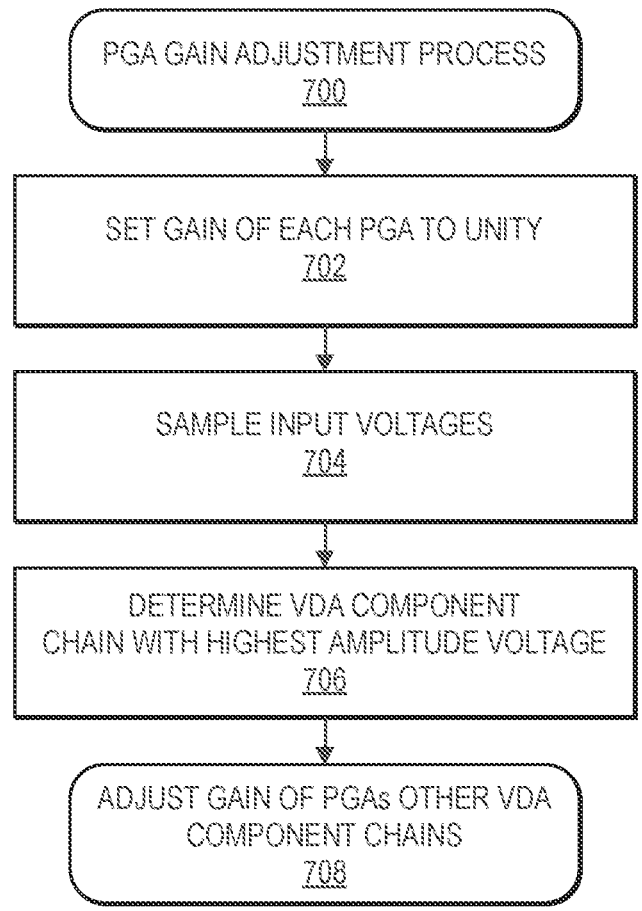
FIG. 7 is an example programmable gain array gain adjustment process, in accordance with described implementations.

FIG. 7 is an example programmable gain array gain adjustment process 700, in accordance with described implementations. The example process 700 may be used to set the gain of one or more PGAs of VDA component chains of an apparatus. In some implementations, the example process may be performed each time an apparatus is plugged into an outlet or otherwise at a power on event of the apparatus.

The example process 700 begins by setting the gain of each PGA of an apparatus to unity, as in 702. Alternatively, each PGA may be set to the same gain, but it need not necessarily be unity. In some implementations, the PGAs of the apparatus may receive an instruction from the SoC of the apparatus to set the gain of each PGA to a same value.

Input voltages on each input channel of the apparatus are then sampled through each VDA component chain, as in 704. The sampled voltages are then compared and the VDA component chain through which the highest voltage was detected is selected as the VDA component chain coupled to the hot wire, as in 706.

The PGA of each other VDA component chain, such as a VDA component chain coupled to a neutral line, is then set to a multiple of the gain of the VDA component chain coupled to the hot wire, as in 708. Setting the gain of other VDA component chains compared to the VDA component chain coupled to the hot wire keeps the channels symmetric. As noted above, in some implementations, if a higher resolution is needed on one or more of the channels, the gain may be further increased in the respective VDA component chain of that channel to further amplify the signal.

Figure 8:
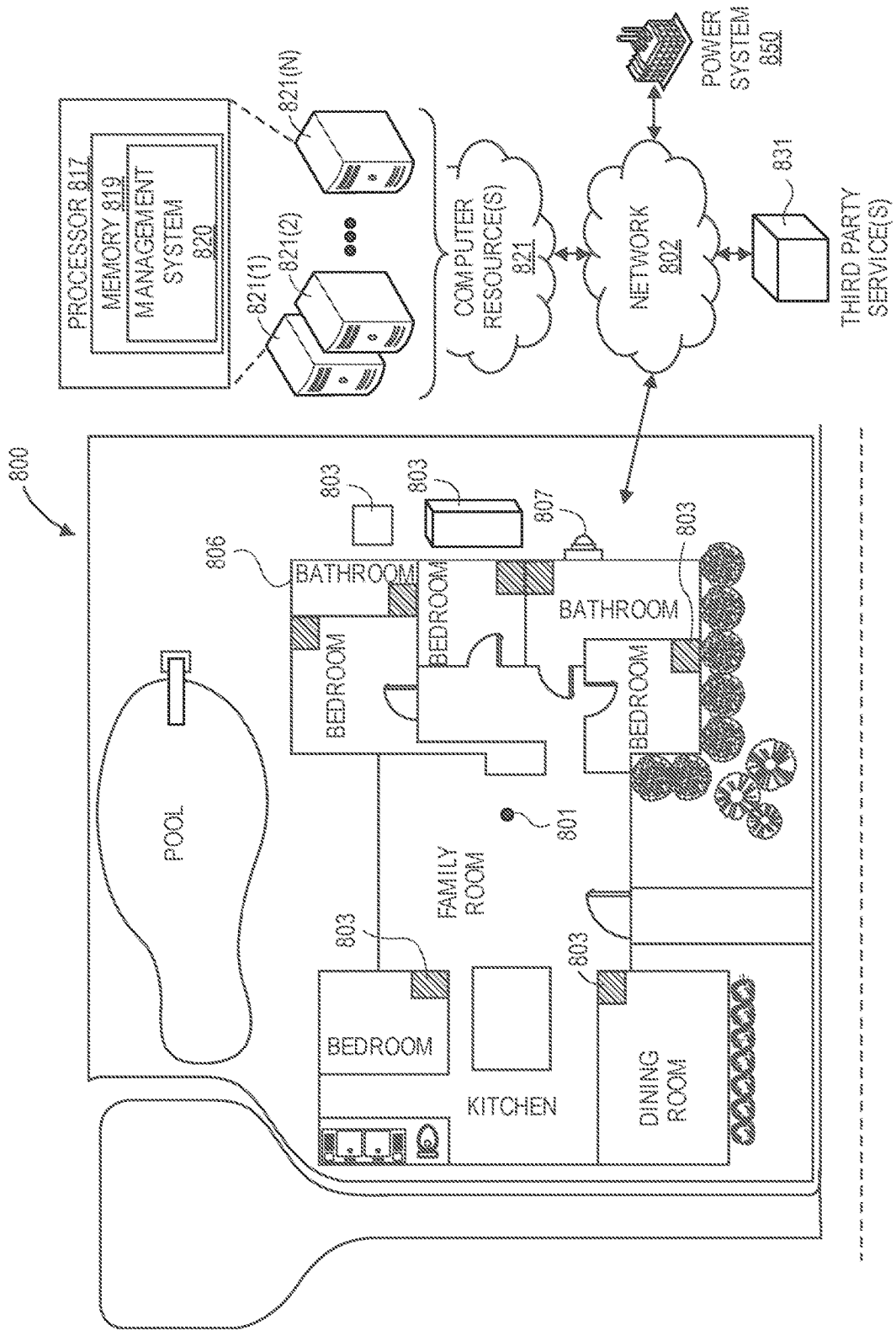
FIG. 8 is a block diagram of a premises for which energy consumption is to be monitored, in accordance with described implementations.

FIG. 8 is a block diagram of a premises 800 for which device detection and energy consumption is to be monitored, in accordance with described implementations. In this example, the premises is a home premises that includes a structure 806 in the form of a personal residence. It will be appreciated that the premises and corresponding structure may be any premises or structure for which energy consumption is to be monitored and/or managed with the described implementations. For example, the premises may be residential, business, commercial, public, etc. Likewise, the structure may be a personal residence, apartment, office building, government building, municipal building, entertainment facility (e.g., coliseum, stadium), shopping facility, etc.

One or more plug-in energy sensors 801 that includes the synchronous voltage signature data collection apparatus discussed above may be positioned at the premises by simply plugging in the plug-in energy sensor into any electrical outlet at the premises 800.

Likewise, each premises includes one or more devices 803 that consume variable amounts of energy based on their usage. The devices 803 may be internal or inside the structure 806, or external or outside the structure 806, and may provide various functions. In some implementations, the devices may be configured to communicate with a communication component to either receive operation instructions and/or to provide usage information.

The plug-in energy sensor 801, in some implementations, may also introduce a known load, such a resistive load, an inductive load, or a capacitive load, into the existing circuit at the premises and monitor for changes as a result of the introduced load. Load introduction may be performed when the plug-in energy sensor is first connected to the circuit to aid in determining the topology and/or characteristics of the circuit at the premises. Likewise, if there is more than one plug-in energy sensor at the premises, a code may be transmitted by a first plug-in energy sensor that is detectable by the second plug-in energy sensor and utilized to determine if the two plug-in energy sensors are on the same phase of the circuit at the premises. For example, if the code is detected by the second plug-in energy sensor, it may be determined that the two plug-in energy sensors are on the same phase. If the code is not detected, it may be determined that the two plug-in energy sensors are on different phases of the circuit.

Still further, a first plug-in energy sensor may introduce a load into the circuit that is detectable by the second plug-in energy sensor and utilized to determine if the two plug-in energy sensors are on the same branch of the circuit at the premises. For example, if there is little to no attenuation or impedance change between the signal produced in response to the introduced load as measured at the first plug-in energy sensor and measured at the second plug-in energy sensor, it may be determined that both plug-in energy sensors are on the same circuit branch. In comparison, if there is a measurable attenuation or impedance change, it may be determined that the two plug-in energy sensors are on different branches of the electrical circuit at the premises.

If it is determined that both plug-in energy sensors are on the same phase and/or same branch of the circuit, a user may be notified and requested to move one of the plug-in energy sensors to a different room, such as a different electrical outlet at the premises, in an effort to position both plug-in energy sensors on different phases and/or branches of the electrical circuit. By having a plug-in energy sensor on each phase of the circuit and/or on different branches, better detection of devices at the premises may be available in comparison to a single plug-in energy sensor or having multiple plug-in energy sensors on the same phase and/or branch of the circuit.

As voltage signature data is collected by the plug-in energy sensor, the voltage signature data may be used by the plug-in energy sensor to identify a device that generated the voltage signature data and/or to determine the state of the device that generated the voltage signature data. In addition, or as an alternative thereto, the voltage signature data may be provided to the management system 820 via a network 802, such as the Internet.

The premises may also include a power meter 803 that measures the amount of energy consumed at the premises. In some implementations, the power meter 803 may include a wireless component that transmits energy consumption data at periodic intervals and/or that may be polled and, in response to a poll, provide energy consumption data. In such an implementation, the energy consumption data may be obtained locally from the power meter 803 by the plug-in energy sensor and/or by another component at the premises (e.g., communication hub) and used to determine the amount of energy consumed by a device during operation of that device or during a particular operating state of the device.

The system may also include computing resource(s) 821. The computing resource(s) 821 are remote from the premises 800. Likewise, the computing resource(s) 821 may be configured to communicate over a network 802 with the premises 800, the plug-in energy sensor 801, and/or the devices 803. Likewise, the computing resource(s) 821 may communicate over the network 802 with one or more power systems 850, and/or one or more third party service(s) 831.

As illustrated, the computing resource(s) 821 may be implemented as one or more servers 821(1), 821(2), . . . , 821(N) and may, in some instances, form a portion of a network-accessible computing platform implemented as a computing infrastructure of processors, storage, software, data access, and so forth that is maintained and accessible by components/devices of the system via a network 802, such as an intranet (e.g., local area network), the Internet, etc. The computing resources 821 may process voltage signature data received from plug-in energy sensor 801, data from third parties 831 and/or data from the power system 850 to determine devices in operation at the premises and/or energy consumed by those devices when operating at the premises 800.

The server system(s) 821 does not require end-agent knowledge of the physical premises and configuration of the system that delivers the services. Common expressions associated for these remote computing resource(s) 821 include "on-demand computing," "software as a service (SaaS)," "platform computing," "network-accessible platform," "cloud services," "data centers," and so forth. Each of the servers 821(1)-(N) include a processor 817 and memory 819, which may store or otherwise have access to a management system 820, as described herein.

The network 802, and each of the other networks discussed herein, may utilize wired technologies (e.g., wires, USB, fiber optic cable, etc.), wireless technologies (e.g., radio frequency, infrared, NFC, cellular, satellite, Bluetooth, etc.), or other connection technologies. The network 802 is representative of any type of communication network, including data and/or voice network, and may be implemented using wired infrastructure (e.g., cable, CAT5, fiber optic cable, etc.), a wireless infrastructure (e.g., radio frequency, cellular, microwave, satellite, Bluetooth, etc.), and/or other connection technologies.

Figure 9:
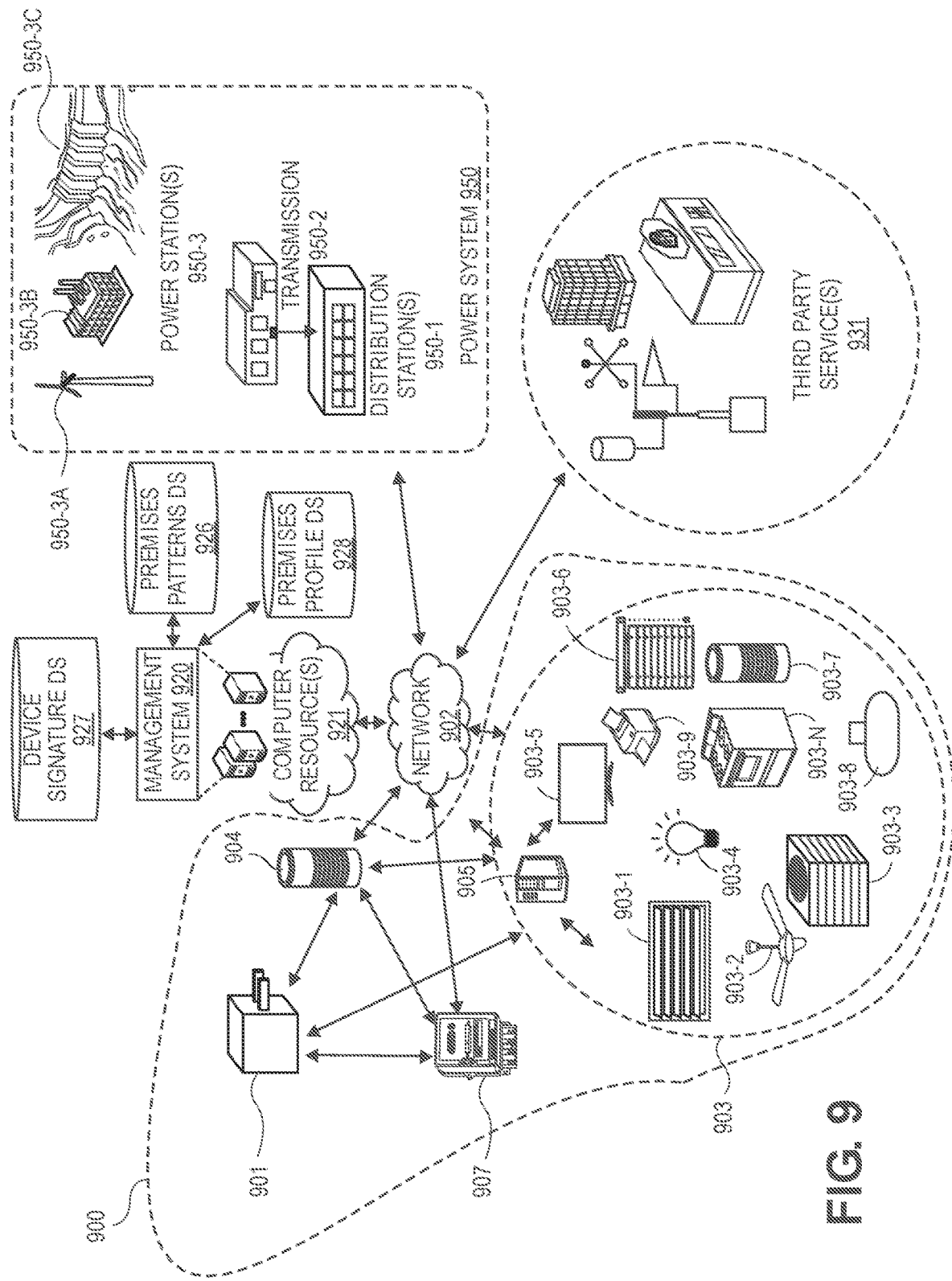
FIG. 9 illustrates a plug-in energy sensor and devices of the premises illustrated in FIG. 8 and the communication paths with remote systems and services, in accordance with described implementations.

FIG. 9 illustrates additional details of a plug-in energy sensor 901, devices 903, third party systems 931, and the power system 950 illustrated in FIG. 8 and the communication paths therebetween, in accordance with described implementations. Example hardware configurations of the plug-in energy sensor 901 are discussed herein. In some implementations, the plug-in energy sensor 901 may be a stand-alone device that may be plugged into any electrical outlet at the premises. In other examples, the plug-in energy sensor 901 may be incorporated into a device 903 and/or included as part of a communication component 904.

The plug-in energy sensor 901 may by powered by the electrical system at the premises, by battery power, and/or powered from other devices or components. For example, the plug-in energy sensor 901 may harvest power from the electrical outlet into which it is installed.

In addition to collecting voltage signature data, the plug-in energy sensor 901 may be configured to communicate with devices 903, a power meter 907 at the premises, and/or a communication component 904 that is also positioned within the premises. For example, the plug-in energy sensor 901 may include a wireless transmitter/receiver that is operable to connect to a wireless network 902 and provide determined voltage signature data to other devices and/or the communication component via the wireless network. In other implementations, the plug-in energy sensor 901 may be configured to transmit data, such as detected voltage signature data, start time and/or stop time of device state changes, and/or device identifiers, to other components, such as the communication component 904 via the electrical circuit at the premises.

Any form of wired and/or wireless communication may be utilized to facilitate communication between the devices and/or sensors. For example, any one or more of 802.15.4 (ZIGBEE), 802.11 (WI-FI), 802.16 (WiMAX), BLUETOOTH, Z-WAVE, near field communication ("NFC"), etc., may be used to communicate between the devices and one or more sensors.

Devices 903 at a premises may include any one or more items that consume energy during operation. Devices may include, but are not limited to adjustable vents 903-1, ceiling fans 903-2, HVAC 903-3, lights 903-4, televisions 903-5, window blinds 903-6, pool pumps or heaters 903-7, hot water heaters 903-8, office equipment, such as computers or printers 903-9, kitchen appliances 903-N (e.g., microwave, stove, refrigerator, freezer), etc.

In some implementations, the devices may be connected devices capable of receiving instructions, referred to herein as command data, from the management system 920, via a communication hub 905, via the communication component 904, and/or directly. In other implementations, one or more devices may not be connected and may only be controllable by either a user at the premises and/or by controlling the circuit that provides power to the device.

Connected devices 903 are configured to receive and execute instructions included in command data sent from the management system 920 operating on a remote computing resource directly, via the hub 905 that is positioned at the premises, and/or via the communication component that is positioned at the premises. Likewise, in some implementations, the devices may be further configured to transmit or send operational information (e.g., energy consumption, errors, etc.) to the management system, the plug-in energy sensor, and/or the communication component 904.

In some implementations, the communication hub 905 may forward voltage signature data received from the plug-in energy sensor 901 to the management system for processing by the management system 920 and/or forward command data received from the management system 920 to various devices 903 for execution. In other implementations, some or all of the processing of the voltage signature data may be performed by the communication hub 905. For example, the communication hub 905 may receive voltage signature data from the plug-in energy sensor 901 and compare the received voltage signature data with stored voltage signature data representative of devices and/or device states of devices at the premises to determine the device and/or the device state of a device that was operating and that generated the voltage signature data. In other implementations, the communication hub 905 may receive voltage data from the plug-in energy sensor, process the data to determine the voltage signature data, and then utilize the voltage signature data to determine the operating device and/or the state of the operating device. In still other examples, voltage data may be sent to the remote management system and the remote management system may process the voltage data to determine the voltage signature data, devices, device state, etc.

While the described implementation discusses a communication hub 905 and a communication component 904 as distinct components, in some implementations, the operation and functions described herein may be performed entirely by one or both of the communication hub 905 or the communication component 904. Accordingly, the use of the terms communication hub 905 and communication component 904 may, in some implementations, be utilized interchangeably.

Regardless of whether voltage signature data is determined at the plug-in energy sensor 901, the communication hub 905, the remote computing system 921, and/or some combination thereof, based on the voltage signature data, a device type, a specific device, device element, and/or a device state of a device may be identified. For example, as discussed further below, the plug-in energy sensor 901 and/or the communication hub 905 at the premises may maintain in a memory, stored voltage signature data corresponding to devices, device types, device element(s), and/or device states of devices known to be at the premises. When voltage signature data is detected by the plug-in energy sensor 901, the plug-in energy sensor and/or communication hub may compare the detected voltage signature data with the stored voltage signature data to determine if the detected voltage signature data corresponds to a known device, device type, device element, and/or device state of a device known to be at the premises. If a match is found, the plug-in energy sensor may transmit to the communication hub 905 and/or the remote management system 920, a device identifier for the device, device type, device element, and/or a device state identifier for a state of the device, along with a start time and a stop time of the device state, indicating a start and stop or change in state of the device 903, as determined from the detected signature. Device state may be any state or detectable change in a device. A device may have two states (on and off) or multiple states. For example, a microwave may have multiple states, including, standby, on, activation of the rotatable table, energizing of the magnetron, and off.

In comparison, if the detected voltage signature data is not matched with a stored voltage signature data, the detected voltage signature data may be sent to the management system 920 for additional analysis. As will be appreciated, the management system 920 may comprise additional compute capacity as well as additional data storage of additional voltage signature data of other devices. For example, the management system may maintain a device voltage signature data store 927 that includes voltage signature data for a large variety of devices, device types, device elements, and/or device states.

Voltage signature data that are maintained in the device voltage signature data store 927 may be generated or obtained from a variety of sources. For example, device manufacturers may provide voltage signature data for devices and/or device states of devices. In other implementations, as devices and/or device states are identified at different premises, the detected device voltage signature data may be aggregated, combined, or added to the device voltage signature data store and used in determining other devices and/or device states at other premises. For example, there may be some signature variation between multiple instances of the same type of device or the same device state of multiple devices of the same device type. As the devices and/or device states are determined at premises, the range of that variation may be updated and used in detecting other instances of that device and/or device state. Accordingly, as additional devices, device states, and/or instances of devices/device states are identified at different premises, voltage signature data for those devices may be included in the voltage signature data store 927, thereby increasing the management system's 920 ability to identify devices/device states at different premises and to determine if those devices are operating within an expected range, as indicated by the voltage signature data detected for the device or a device state of that device.

When the management system 920 receives voltage signature data it may first compare the voltage signature data with device type signatures to determine a device type (e.g., refrigerator, television, toaster, heater) of the device that generated the voltage signature data. Upon determining a device type, the management system may then compare the voltage signature data with voltage signature data of that device type to determine a match having a highest similarity with the voltage signature data, thereby determining the device and/or the device state of the device. In some implementations, upon determination of the device, device type, and/or device state, the management system may send to the communication hub at the premises, and/or to the plug-in energy sensor, an identification of the newly identified device, device type, and/or device state along with the corresponding voltage signature data. Such information may be added to the stored voltage signature data at the premises and/or added to the premises profile data store 928 that is maintained by the management system 920.

In some implementations, additional information from other devices at the premises may also be utilized by the communication hub 904 and/or the management system 920 to determine the device. For example, information received from one or more connected devices may be used to limit or identify candidate devices that are known to be operating and/or to remove from consideration devices that are known to not be operating. Likewise, sensors at the premises may be used to assist in device determination. For example, a light or motion sensor may provide data indicating whether a person is moving in areas of the premises and/or whether lights are on/off within areas of the premises. As another example, image data and/or other information, such as device identification of a device in the possession of a person, may be used to identify a person at the premises. Such information may be used to expand or reduce the list of candidate devices that may be operating and generating the detected signal.

In addition to determining a device and/or the device state of the device, the management system 920 may also receive from a power system 950, such as a power company, energy consumption information for the premises 900, which the management system may maintain in the usage pattern data store 926 for the premises. The management system may then determine energy consumption by devices operating at the premises by combining the received energy consumption information with the operation information or device state information for devices at the premises. For example, the energy consumption information, may be utilized to determine an increase in energy consumption at the premises between the start time and the stop time corresponding to voltage signature data detected at the premises. This increase in energy consumption between the start time and stop time is indicative of the energy consumed by the device that generated the voltage signature data.

In some implementations, energy consumption data may be obtained at the premises, for example, from a power meter or service meter at the premises. For example, a power meter may include a wireless transmitter and may be configured to provide energy consumption data on a periodic and/or responsive basis. While this information may be generally collected for and by the power company, the information may also be collected by the plug-in energy sensor and/or the communication hub 904 and used to determine the change in energy consumption between the start time and stop time for the identified device.

User acknowledgement or approval may be obtained before energy consumption information and/or information from other devices is collected and used with the described implementations. Likewise, in implementations, user acknowledgement or approval may be obtained before any data is transmitted from the premises to the remote system and/or before any transmitted data is aggregated or used in detecting devices at other premises.

As discussed further below, based on the device/device type, time of operation, and amount of energy consumed by operation of the device, one or more energy saving actions and/or recommendations may be made for the premises and/or the device. For example, the management system 920 may determine if the identified device is operating as expected and/or a potential return on investment if the identified device was replaced with another device of the same device type (e.g., a more energy efficient device). Based on these additional analysis, one or more recommendations may be made.

In some implementations, third party systems 931 may also provide data, such as weather data, device data, expected energy consumption for devices, device voltage signature data, etc., to the management system 920. Third party systems include any type of system or service that is independent of the premises that provides data that may be used by the management system 920 to determine energy saving actions that may be performed by one or more devices at the premises. For example, the third-party system 931 may be a device manufacturer that provides expected energy consumption information for devices and/or voltage signature data for devices. In such an example, the management system 920 may utilize the expected energy consumption information for a device to determine if that specific device is operating as expected and/or whether replacement of an existing device with a different device of the same device type will save energy. Likewise, the voltage signature data for the device may be used to detect operation of the device at a premises, as discussed herein.

The power system 950 may also communicate with the management system 920 and provide, for example, energy consumption information for the premises, demanded power information, or load on the power system, forecasted power demands, costs per unit of power under different operational constraints, etc. For example, the power system 950 may provide information to the management system indicating which power stations are currently operating, the cost per unit of energy produced, and the current load on the power station, also referred to herein as load value. Alternatively, or in addition thereto, energy consumption for a specific premises may be provided by a device at the premises, such as the power meter 907.

A power system 950 typically includes one or more power station(s) 950-3, transmission station(s) 950-2, and distribution station(s) 950-1. Premises, such as premises 900 create demand for power provided by the power system 950 and pay for that power.

Power stations 950-3 may include any form of power generation. For example, a power station 950-3 may be a wind-based power station 950-3A, such as a wind farm, a fossil fuel-based power station 950-3B, a hydroelectric power station 950-3C, a solar power station, a nuclear power station, etc. The power system 950 may include any number and type of power stations 950-3.

Electric power generated by the power stations 950-3 is bulk transmitted at high-voltages via a series of transmission 950-2 lines and stations from the generating power stations 950-3 to distribution stations 950-1. Transmission 950-2 lines and stations when interconnected with each other create transmission networks, which are often referred to as "power grids." The United States has three major power grids, the Western Interconnection, the Eastern Interconnection and the Electric Reliability Council of Texas (ERCOT) grid, often referred to as the Western Grid, the Eastern Grid and the Texas Grid.

The distribution stations 950-1 are located near the premises 900 that create the demand for the power. The distribution stations 950-1 receive the bulk transmissions, step down the voltage and distribute the electricity to end premises 900, such as residential housing, businesses, commercial buildings, etc.

A few of the major constraints with power systems is that power within the system must run at the same frequency and, with only a few exceptions, electrical energy cannot be stored. As such, power must be generated and supplied in real-time at a rate that matches demand. If the demand for power exceeds supply, additional power stations 950-3 must be activated to fulfill the additional demand, or brownouts or blackouts may be experienced at numerous premises that rely upon that power. The distribution stations typically charge the premises for the consumption of energy as a measure of kilowatt-hours (kWh), which is a measure of energy. The rate per kWh generally varies based on the current power demand or load of the power system and/or based on the average or expected power demand on the power system. As the power demand on the power system 950 increases, the cost per unit of energy consumed by each premises likewise typically increases.

The implementations described herein receive the voltage signature data and start/stop times of operation from one or more premises, the third-party data, and data from the power system and process that data to determine energy saving actions that may be performed by devices at the one or more premises.

Figure 10A:
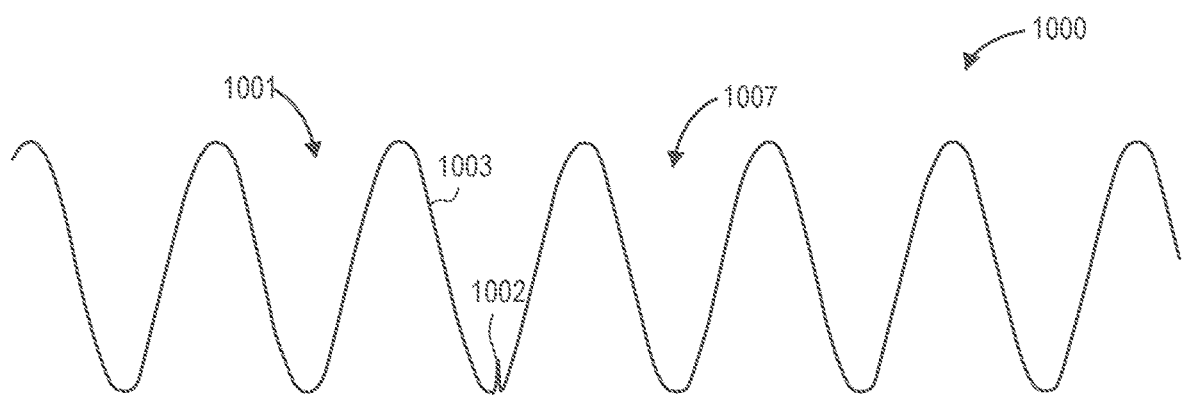
FIG. 10A illustrates an example voltage signal measurement over a period of time on the hot wire of a circuit, in accordance with described implementations.
Figure 10B:
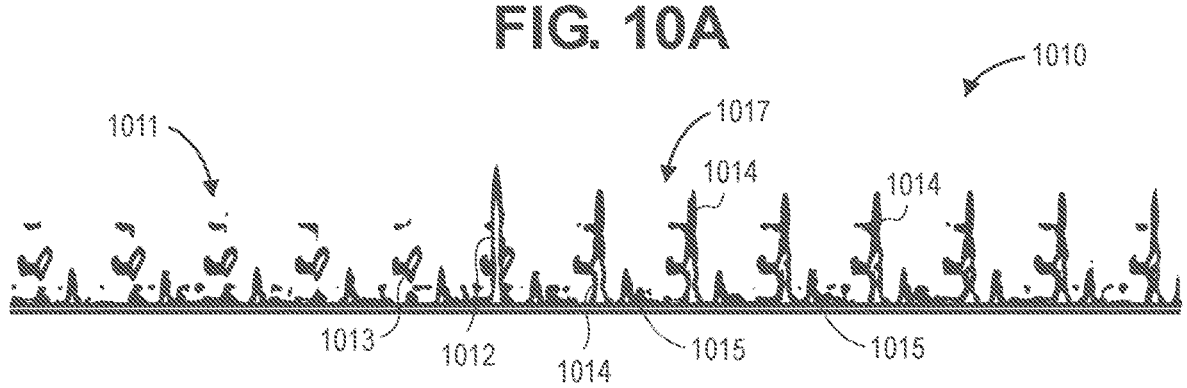
FIG. 10B illustrates an example spectrograph representation of the voltage signal of FIG. 10A, in accordance with described implementations.
Figure 10C:
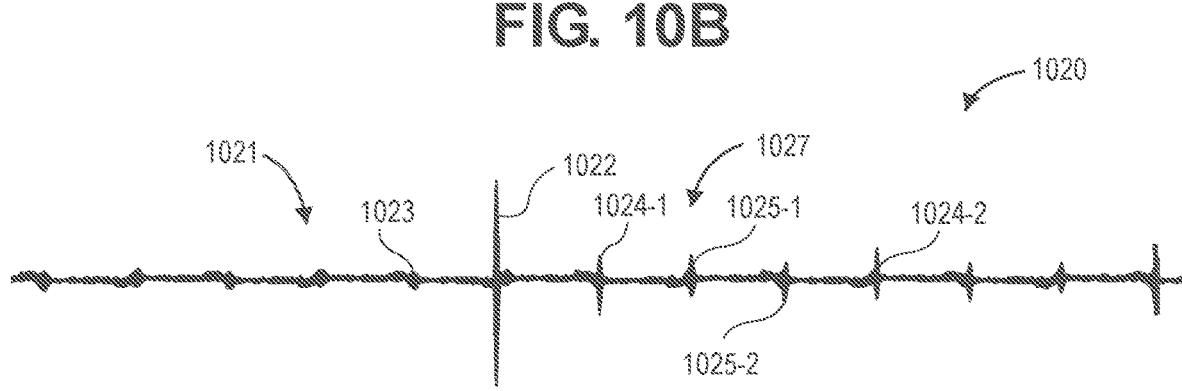
FIG. 10C illustrates an example voltage signal measurement over a period of time on the neutral wire of a circuit, in accordance with described implementations.
Figure 10D:
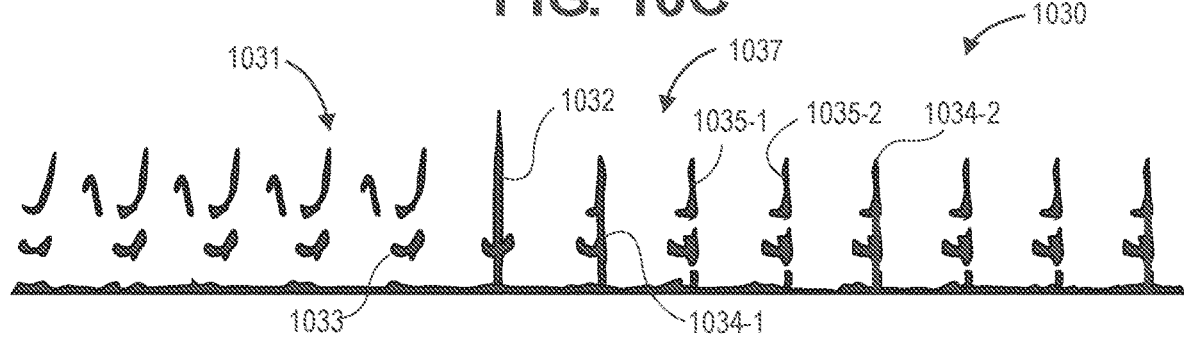
FIG. 10D illustrates an example spectrograph representation of the voltage signal of FIG. 10C, in accordance with described implementations.

FIGS. 10A through 10D illustrate example voltage signatures that may be generated by a device during one or more device states of the device, in accordance with described implementations. In this example, FIG. 10A illustrates an example voltage signal 1000 measured over a period of time on the hot wire of a circuit, in accordance with described implementations. FIG. 10B illustrates an example spectrograph representation 1010 of the voltage signal of FIG. 10A, in accordance with described implementations. FIG. 10C illustrates an example voltage signal 1020 measurement over a period of time on the neutral wire of a circuit, in accordance with described implementations. FIG. 10D illustrates an example spectrograph 1030 representation of the voltage measurement of FIG. 10C, in accordance with described implementations. As discussed further below, in some implementations, in addition to or as an alternative to measuring voltage signals on the hot wire and the neutral wire, voltage signals on the ground wire may be monitored and used as an input in determining an identity of an operating device.

As can be seen in each of the voltage signals, during an initial time 1001, 1011, 1021, 1031, there are no devices operating and the voltage in this example is 120 volts at a sixty hertz frequency as illustrated by signals 1003, 1013, 1023, 1033. When a device, in this example Device A, is activated, an initial voltage increase is introduced into the signal, as represented by the peak 1002 in the signal 1000, the peak 1012 in the spectrograph 1010, the peak 1022 in the signal 1020, and the peak 1032 in the spectrograph 1030. The device continues to operate as illustrated by the portions 1007, 1017, 1027, and 1037 following the initial peak. In addition, the periodic nature of the voltage change may be utilized as the voltage signature data for Device A. For example, looking at the spectrograph 1017 of FIG. 10B periodic large peaks 1014 and following smaller peaks 1015 on the hot wire have a distinct pattern during device operation. In a similar manner, the signal 1020 measured on the neutral wire illustrates periodic voltage peaks 1024-1, 1025-1, 1024-2, and 1025-2 that are introduced by operation of Device A. In addition, the amplitude of the peaks 1024-1, 1024-2 are separated by a pattern of two smaller amplitude peaks 1025-1, 1025-2. This cycle repeats during operation of Device A, thereby providing another portion of the voltage signature data generated by Device A during operation. Finally referring to the spectrograph of the neutral wire signal, the repeating patterns of two peaks 1034-1 and 1034-2 are separated by smaller peaks 1035-1 and 1035-2. In some implementations, signals on the ground wire may also be measured by the plug-in-energy sensor. For example, the ground wire with respect to a floating point, such as a smooth version of voltage), may be monitored for noise or voltage introduced to the ground wire during device operation. Monitoring the ground wire may be particularly beneficial in detecting operation of certain electronic devices that utilize a power supply that couples the capacitor bank to the ground wire using a resistor or other coupling. Likewise, ground wire monitoring may aid in the determination of device malfunction as many devices, as they begin to malfunction or lose efficiency, introduce an unexpected voltage on the ground wire.

The different patterns of voltage changes on the measured hot wire, neutral wire, and/or ground wire, as detected by the plug-in energy sensor, collectively provide voltage signature data that is representative of an operation of Device A. As discussed herein, as the voltage signature data is detected, the voltage signature data can be compared to stored voltage signature data to identify Device A.

In addition to monitoring for signals indicating device operation, in some implementations, the plug-in energy sensors may actively model or determine the topology or characteristics of the electrical circuit at the premises to which they are connected. By modeling the electrical circuit, the plug-in energy sensor or the remote management system may determine a baseline signal of the circuit at the premises, determine behavior and responses to different loads when introduced to the circuit, etc. Such information increases the fidelity and accuracy of signal extraction and device detection.

Figure 11:
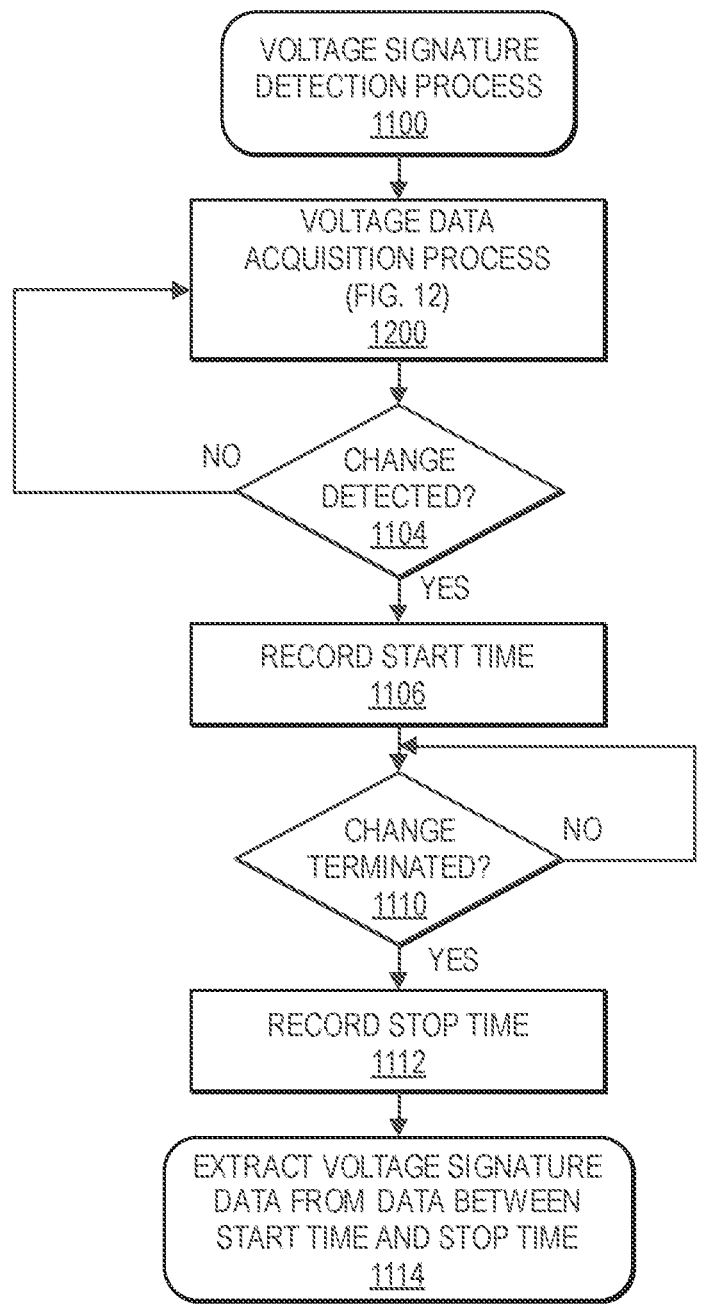
FIG. 11 illustrates an example voltage signature detection process, in accordance with described implementations.

FIG. 11 illustrates an example voltage signature data detection process 1100, in accordance with described implementations. The example process begins by monitoring for a voltage change at a premises using the voltage data acquisition process 1200 discussed with respect to FIG. 12. As discussed, a known or baseline voltage signature data (e.g., 120 V at 60 Hz) may be known for a premises and monitored for deviations over a period of time. A variety of techniques may be utilized to determine voltage changes including, but not limited to, monitoring for changes in amplitude, spectral changes, and/or waveform or wave shape changes. In some implementations, the voltage changes may be monitored on a time basis to detect changes in the voltage over a period of time (e.g., comparing $T_0$ with $T_1$, etc.). Likewise, the voltage change may be monitored on any one or more of the hot wire with respect to ground, the neutral wire with respect to ground, the ground wire with respect to a reference, such as a smooth voltage waveform, and/or the hot wire with respect to the neutral wire.

As the voltage at the premises is monitored, a determination is made as to whether a change in the voltage is detected, as in 1104. If no change is detected, the example process returns to block 1200 and continues monitoring for changes in the voltage at the premises. If a change is detected at decision block 1104, a start time of the detected change is recorded, as in 1106. A start time may be any identifier or marker indicating a time at which the voltage change at the premises is detected.

As the voltage data is recorded, a determination is made as to whether the change in the voltage has terminated, as in 1110. Determining whether the change in voltage has terminated may be done for a period of time before it is confirmed that the change has terminated. For example, some device states may generate voltage signature data in which there is no additional voltage at periodic intervals, e.g., during the open/close of relay switches of the device, but the device is still in the same device state. By confirming that there is no voltage change for a defined period of time, e.g., five seconds, it may be confirmed whether the device has changed device states.

If it is determined that the voltage change has not terminated, the example process 1100 remains at decision block 1110. Once the device state changes, the voltage change will terminate or change and the transition will be detected by the example process 1100. If it is determined that the voltage data has changed, a stop time indicating the change is recorded, as in 1112.

Finally, the recorded voltage data between the start time and the stop time is processed to extract the voltage signature data of the device, as in 1114. As discussed, the voltage signature data may be extracted by subtracting out the baseline voltage signature data and this may be done on one or more of the hot wire, the neutral wire, or the ground wire. Additionally, or as an alternative thereto, the voltage signature data resulting from device operation or device state may be determined based on an increase in amplitude of the voltage signal during the period of time, based on a spectral analysis of the recorded data, and/or based on wave shape or waveform analysis of the recorded voltage data. Likewise, the voltage signature data produced from an introduced load may be predictable based on the load that was introduced.

Figure 12:
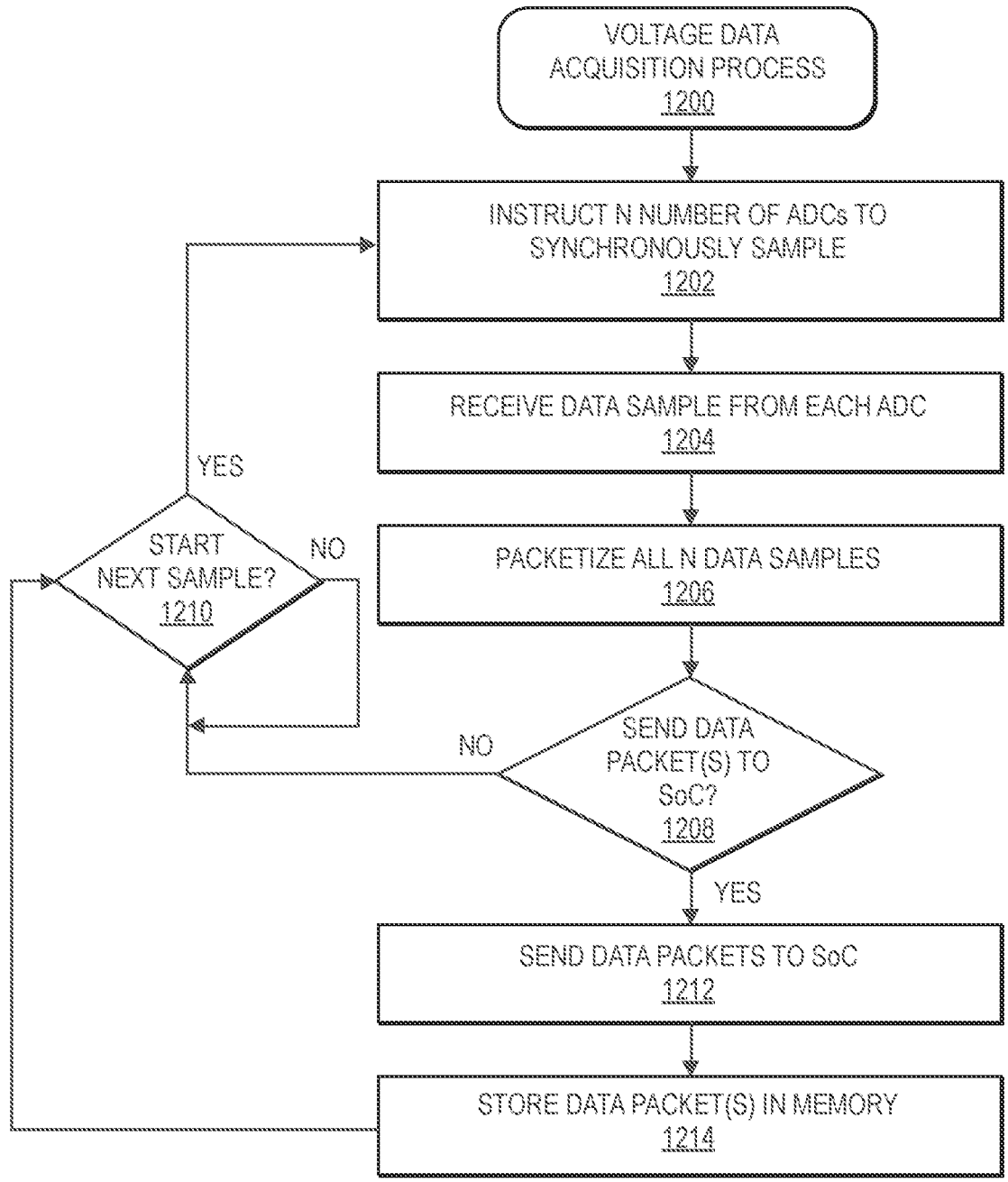
FIG. 12 is an example voltage signature data acquisition process, in accordance with described implementations.

FIG. 12 is an example voltage signature data acquisition process 1200, in accordance with described implementations.

The example process 1200 begins by an FPGA of a synchronous voltage signature data collected apparatus instructing N number of ADCs to substantially simultaneously sample voltage data, as in 1202. Substantially simultaneous sampling of voltage data by multiple ADCs is discussed above.

As discussed above, as each ADC samples and generates voltage data samples, the voltage data samples are substantially simultaneously sent from each ADC and received by the FPGA, as in 1204. The FPGA packetizes the data samples, as in 1206, and a determination is made as to whether the packets of data samples are to be sent from the FPGA to the SoC, as in 1208. As discussed above, the voltage data samples may be maintained in a memory or registry of the FPGA and sent in batches to the SoC. Alternatively, the voltage data samples may be sent to the SoC as they are received and packetized by the FPGA.

If it is determined that the data samples are not to be sent to the SoC, a determination is made as to whether a next sample is to begin, as in 1210. If it is determined that a next sample is not yet to begin, the example process 1200 remains at decision block 1210. Once it is determined that a next sample is to begin, the example process 1200 returns to block 1202 and continues.

If it is determined at decision block 1208 that data packets are to be sent from the FPGA to the SoC, the data packets are sent from the FPGA to the SoC, as in 1212. Any transfer protocol may be used to send the data packets from the FPGA to the SoC. For example, the data packets may be sent in blocks of data, streamed, and/or otherwise transmitted from the FPGA to the SoC.

The voltage data samples received at the SoC may then be stored in a memory of the SoC, as in 1214. Likewise, in some implementations, the voltage data samples may be processed, as discussed herein, to determine voltage signature data from those voltage data samples.

Figure 13:
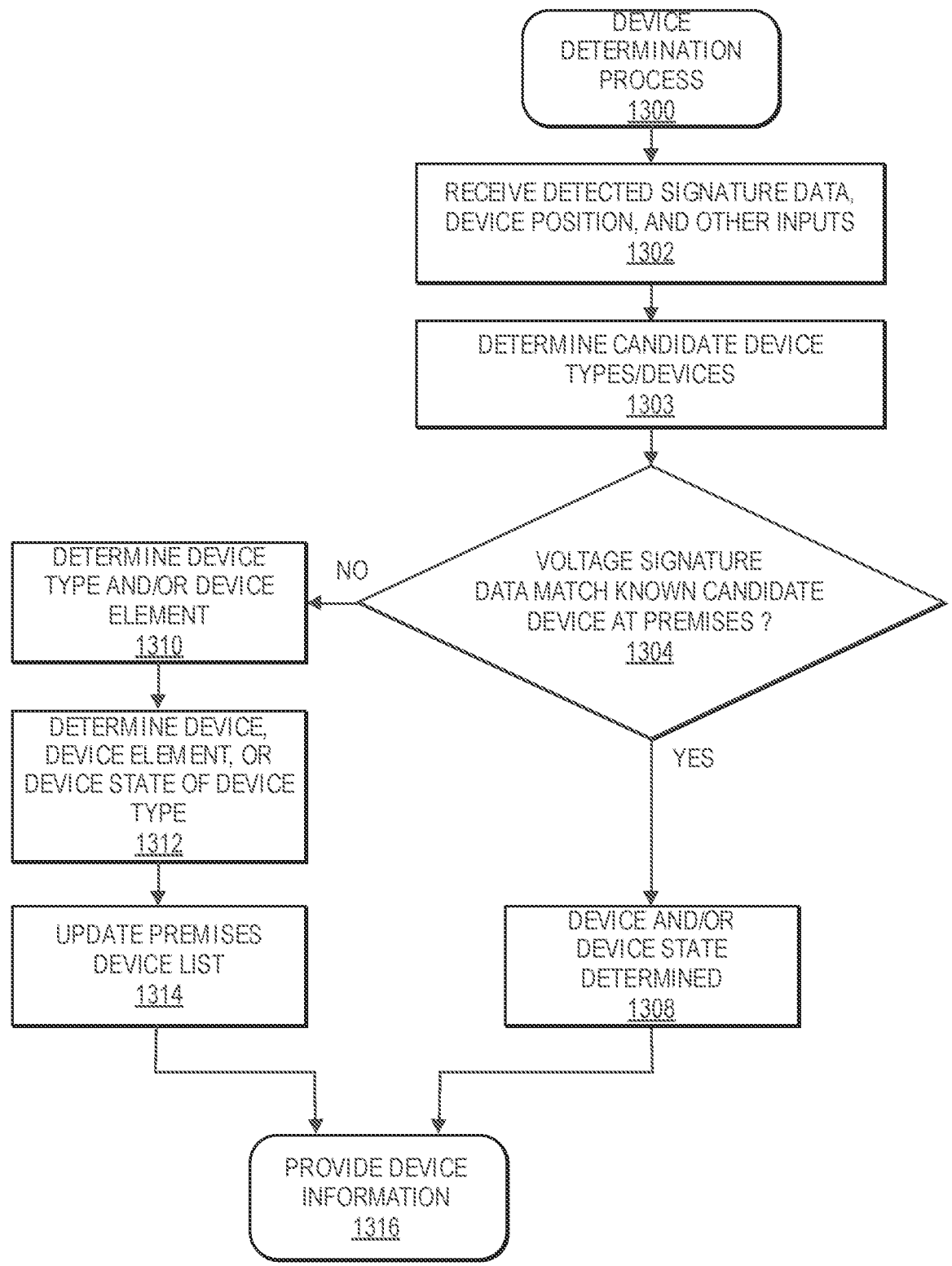
FIG. 13 illustrates an example device determination process, in accordance with described implementations.

FIG. 13 illustrates an example device determination process 1300, in accordance with described implementations. The example process 1300 may be performed at the plug-in energy sensor, at a communication hub or communication component at the premises, at the remote management system, or portions of the example process 1300 may be performed at different locations.

The example process 1300 begins upon receipt of a detected voltage signature data, device position, user presence, and/or other inputs, as in 1302. Other inputs may include, but are not limited to, voltage signature data detected from one or more loads introduced into the circuit by the plug-in energy sensor and/or another plug-in energy sensor, during operation of the device, data from the operating device and/or other devices or sensors at the premises, energy usage information, etc. For example, other devices at the premises may provide data indicating presence of users at the premises, changes in environment conditions at the premises (e.g., lighting changes resulting from the on/off of a light at the premises, temperature changes), etc. In still other examples, other inputs may include the time of day and predictive modeling that has been developed for the premises over a period of time to predict candidate devices that may be operating and/or the device state of those devices.

If other inputs are received, those inputs may be used to determine candidate device types, candidate devices, and/or candidate device elements that may have been operating or confirmed to not be operating at the premises, as in 1303. As inputs are collected and associated with identified devices, those inputs may be used as data points to determine candidate device types, candidate devices, or candidate device elements for consideration in device identification and/or device state determination.

Once candidate devices are determined, the voltage signature data is compared with known voltage signature data of those candidate devices and/or voltage signature data of different device states of those candidate devices to determine if there is a match between the received voltage signature data and a known voltage signature data of a known candidate device or device state of a known candidate device at the premises, as in 1304. In some implementations, each time the example process 1300 is performed, and a new device or device state is identified for a premises, the device and/or device state and corresponding voltage signature data may be added to a premises datastore that identifies devices and/or device states and corresponding voltage signature data for the premises. Then, when the example process 1300 is performed in the future, it may first compare a received voltage signature data with voltage signature data of devices and/or device states of devices known to be at the premises, thereby reducing processing time and compute requirements and increasing accuracy of device identification and/or device state determination for the premises. In addition, in some implementations, the identity of the identified device and/or device state and corresponding voltage signature data may be provided to the remote management system and added to the device voltage signature data store for the device/device state and aggregated with voltage signature data of other premises for use in future identification of devices and/or device states at various premises.

If it is determined that the voltage signature data matches a voltage signature data of a candidate device known to be at the premises and/or a device state of a candidate device known to be at the premises, the device and/or device state is determined, as in 1308. However, if it is determined that the voltage signature data does not match a stored voltage signature data of a candidate device known to be at the premises and/or a device state of a candidate device known to be at the premises, additional processing of the voltage signature data is performed to determine a device type and/or device element corresponding to the voltage signature data, as in 1310. Additional processing may include comparing the voltage signature data to different voltage signature data profiles for different device types/device elements and/or processing segments of the voltage signature data to identify markers in the voltage signature data that correspond with markers of different device types and/or different device elements. For example, voltage signatures of all brands of microwave ovens may include markers that are common or similar. For example, all brands of microwave ovens may have an initial voltage increase at power on (a device state), a second voltage increase when rotation of the turntable is activated (another device state), and a third voltage increase when the magnetron of the microwave is energized (another device state). While these voltage increases and device states may be different for different brands of microwaves, the pattern or relationship between the state changes may be similar, thereby generating markers for all brands of microwaves that may be utilized to initially classify voltage signature data by device type (e.g., microwave).

Upon determination of the device type and/or device element, the voltage signature data may then be compared to stored voltage signature data of devices of that device type and/or devices that include the determined device element to determine the specific device and/or device state(s) that generated the received voltage signature data, as in 1312. Similar to comparing the received voltage signature data with stored voltage signature data of candidate devices known to be at the premises and/or device states of candidate devices known to be at the premises, to determine a device of the device type or that includes the device element, the received voltage signature data is compared with voltage signature data of devices or device states of devices of the device type and/or devices that have or include the determined device element to determine the stored voltage signature data that has a highest similarity to the received voltage signature data. In some implementations, a confidence level may be determined and if it cannot be determined with a high enough degree of confidence, a notification may be sent to the premises that identifies the device or devices that have been determined to have similar voltage signature data, along with a request for device confirmation. In such an example, the potential devices may be indicated to a user at the premises and the user may select or specify the correct device. Once the device and/or device state has been determined, the premises device list may be updated to include the device and/or device state and the voltage signature data corresponding to that device/device state, as in 1314.

Upon determination of the device and/or device state in block 1308 or upon updating the premises device list at block 1314, device information for the device is provided, as in 1316. As discussed above, device information may include, but is not limited to, the device type, the device identifier, the operating state of the device, the energy consumed by the device, etc.

As noted above, some or all of the example process 1300 may be performed at the plug-in energy sensor, some or all of the example process 1300 may be performed by the communication hub or the communication component, and/or some or all of the example process 1300 may be performed by the remote management system. For example, the plug-in energy sensor and/or the communication hub/component may maintain, in memory, voltage signature data for devices known to be at the premises and/or device states of devices known to be at the premises and may perform steps 1300 through 1308. However, if the voltage signature data is not matched with a voltage signature data of a known device/device state, the voltage signature data may be sent via a network to the management system and the management system may perform steps 1310 through 1314 to determine the device and/or device state represented by the voltage signature data.

Figure 14:
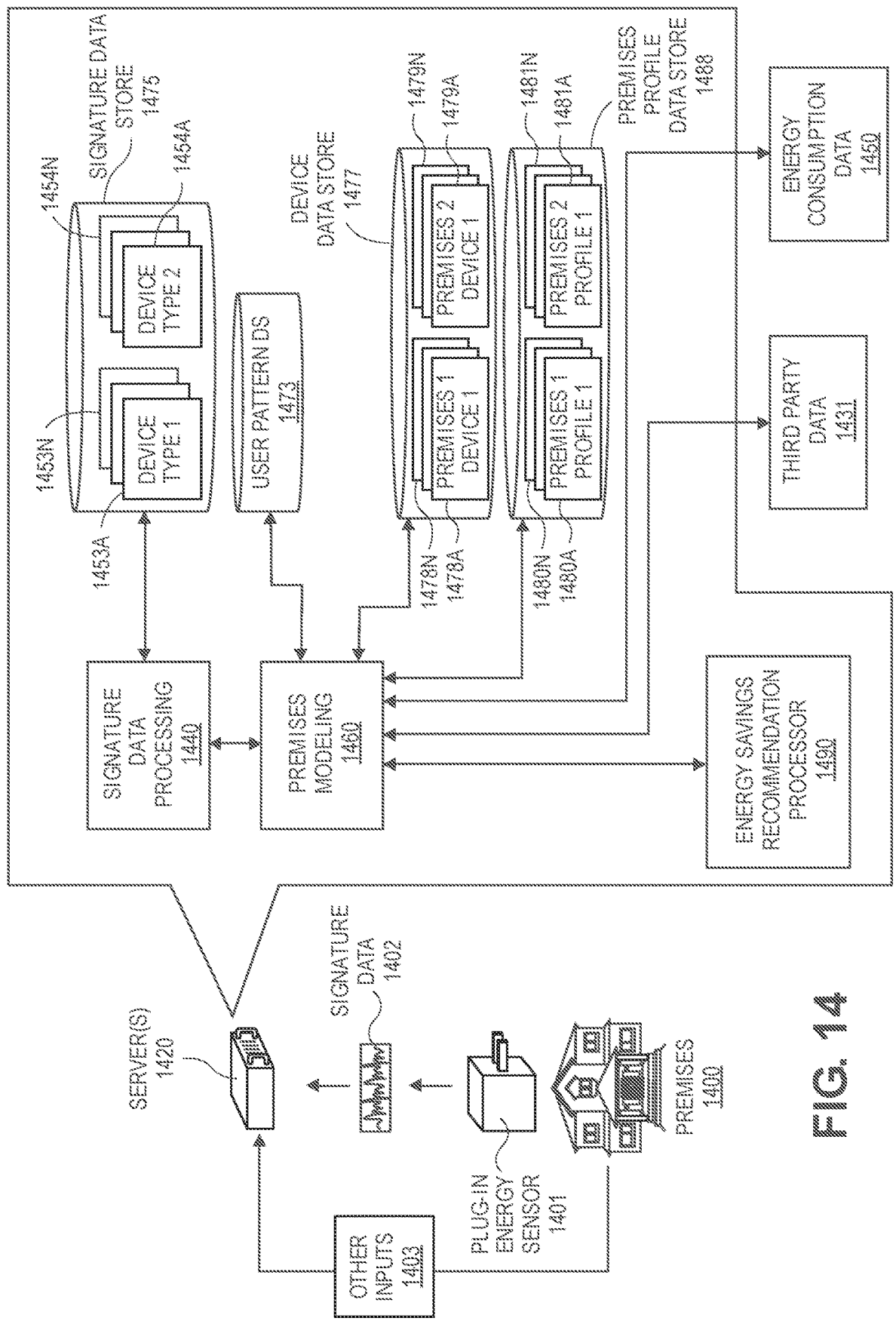
FIG. 14 illustrates example components of a management system, in accordance with described implementations.

FIG. 14 is a conceptual diagram of a server 1420 that processes voltage data and/or other inputs 1403 received from plug-in energy sensors 1401 at various premises 1400, receives third party data 1431 from third parties, energy consumption data 1450 for different premises 1400, and provides energy saving recommendations, in accordance with described implementations. The various components of the server 1420 may be located on the same or different physical devices. Communication between various components illustrated in FIG. 14 may occur directly or across a network. The server 1420 discussed with respect to this FIG. 14 may be the same or a different server than the server(s) discussed above. In operation, the server 1420 may include computer-readable and computer-executable instructions that reside on the server 1420 and perform one or more of the described features or functions, also referred to herein as a management system.

The energy savings recommendation processor 1490 may function to determine and recommend one or more energy savings actions, such as operating a device at a different time of day or replacing a device with a more energy efficient model. Upon determining one or more energy savings actions to be performed at a premises, the energy savings recommendation processor 1490 may generate and send command data and/or message data to a communication component, communication hub, and/or devices at the premises 1400 for presentation to a user at the premises and/or for programmatic execution by the device(s) at the premises 1400.

Voltage signature data 1402 from one or more plug-in energy sensors 1401 at a premises 1400 is transmitted in real time, near real time, or periodically to one or more remote computing resources, illustrated in this example as a server 1420. The server receives and processes the voltage signature data 1402 with voltage signature data processing 1440. Processing may include processing the voltage signature data to determine a device, a device type, device element, and/or device state that generated the voltage signature data 1402 by comparing the voltage signature data to stored voltage signature data that is known to be generated by different devices, device types, device elements, and/or device states to determine differences between the stored voltage signature data and the received or determined voltage signature data 1402. The voltage signature data store 1475 may maintain device type information and/or signature models, which may include markers representative of different voltage signature data for different device types. For example, voltage signature data of device type 1 may include multiple different markers 1453A-1453N corresponding to different voltage changes at different time intervals that are characteristic of devices of a particular device type. Likewise, voltage signature data of device type 2 may include multiple different markers 1454A-1454N corresponding to voltage signature data generated by devices of that device type.

The device types and/or device voltage signature data maintained in the voltage signature data store 1475 may be aggregated from multiple premises as devices at those premises are determined. The aggregated data may then be used to identify devices and/or device states of devices at other premises and, as those devices/device states are identified, the device voltage signature data at those premises added to the data store. As such, the voltage signature data store 1475 will continue to expand and include device voltage signature data for more and more devices and/or device states of devices.

In some implementations, rather than voltage signature data 1402 being sent from the premises 1400 to the servers 1420, the plug-in energy sensor 1401, a communication hub at the premises, or a communication component at the premises may process the voltage signature data to determine a device, device type, device element, and/or device state of a device at the premises that generated the voltage signature data. A device identifier of the determined device and/or device state, a start time and a stop time corresponding to the voltage signature data may then be sent to the servers 1420 for additional processing.

As voltage signature data is collected and devices and/or device states determined, the information, including the device and/or device state identifiers, voltage signature data, times of operation, etc., may be aggregated with other voltage signature data generated by other devices at the premises 1400 to develop a premises profile 1480, that is stored in a premises profile data store 1488, using a premises modeling component 1460. The premises profile 1480 may include device identifiers and/or voltage signature data for devices and/or device states of devices known or determined to be at the premises 1400, any operational relationships between devices and/or device states, voltage signature data of those devices and/or device states, predicted times when those devices will be operating in different device states, etc. In addition, in some implementations, the premises profile 1480 may also maintain expected and/or actual energy consumption information for detected devices. For example, received third party data 1431 may include expected energy consumption information for different device models. The premises modeling component 1460 may also receive energy consumption data 1450 and utilize that information to determine actual energy consumption for devices at the premises. As discussed above, the changes in actual energy consumption at different periods of time may be combined with start times and stop times of determined device operation at the premises 1400 to determine the amount of energy actually consumed by devices at the premises during operation.

As premises profiles 1480 are developed for different premises, those profiles may be stored in a premises profile data store 1488. In some implementations, different premises profiles may be generated for a premises based on, for example, the day of the week, the number of people at the premises, etc. Over time, multiple premises profiles may be created for each premises and maintained in the premises profile data store 1488. For example, premises 1 may include multiple premises profiles 1480A-1480N generated at different points in time for that premises. Likewise, premises 2 may include multiple premises profiles 1481A-1481N generated at different points in time for that premises. Every premises may include one or more premises profiles that are stored in the premises profile data store 1488. The premises profiles, which may be associated with different periods of time during the year, may be used to predict device states and times during which devices are in high demand/high use or low demand/low use.

In some implementations, in addition to determining energy saving actions and expected energy savings, the premises profiles may be used to determine efficiency losses of a device or problems (e.g., mechanical or electrical) with the device. For example, if an expected energy consumption for a device at a premises is different than the actual energy consumption for that device under the same or similar conditions, such a difference may be indicative of problems with the device.

In some implementations, voltage signature data may likewise be used to determine user profiles and/or usage patterns corresponding to the premises 1400. For example, voltage signature data may be used to determine the presence or absence of users at the premises and/or at particular areas within the premises. As users typically follow a patterned behavior, over time, the voltage signature data may be used to determine those user patterns and such information may be stored in the user pattern data store 1473. For example, voltage signature data from device operation of devices at the premises may be aggregated over a period of time (e.g., thirty days) to determine that on Monday, Tuesday, Wednesday, Thursday, and Friday, a user at the premises generally enters the kitchen within the structure between 05:00 hours and 05:30 hours, moves to a second room between 06:30 hours and 07:30 hours and then departs the premises until approximately 18:00 hours. Such information may be maintained in the user profile for the user.

In some implementations, a device data store 1477 may also be maintained. The device data store 1477 may include information regarding devices at each premises. For example, the device data store may maintain device information 1478A-1478N for each of multiple different devices at a first premises, maintain device information 1479A-1479N for each of multiple different devices at a second premises, etc.

Device information may include, among other information, voltage signature data generated by different device states of the device, the manufacturer of the device, the make, model, and year of manufacture, the power rating of the device, the efficiency of the device, etc. In some implementations, data received from a same type of device operating at different premises may be compared to determine consistency among devices and/or to detect potential device problems or abnormalities. For example, if there are fifty microwaves of Brand A and forty-nine of them have similar power demands but the fiftieth one has a higher power demand, it may be determined that the fiftieth microwave is potentially malfunctioning.

In response to receiving voltage signature data from the server 1420 (FIG. 14), or when it is otherwise determined that one or more energy saving actions or recommendations are to be determined for a premises, the premises modeling component 1460 obtains current sensor data, third party data 1431, such as expected device energy consumption, actual energy consumption data 1450 for a premises, premises profile and/or user profile data and utilizes that information to determine one or more energy saving actions or recommendations for the premises. For example, one or more modeling algorithms may receive the various inputs and determine one or more energy saving actions for a relevant period of time that will produce the highest energy savings from the premises with the least inconvenience or negative impact on the user. For example, if the energy saving action is to be performed on a Saturday between 12:00 hours and 14:00 hours it may be determined that the most effective energy saving action may be to shut off the hot water heater during that time. Such an action may substantially reduce the power demand from the premises and be of limited interference to the user at the premises because the premises profile, user profile, and/or usage patterns indicate that hot water from the hot water tank is rarely used during that time period.

Upon determining by the premises modeling component 1460 one or more energy saving actions, the energy savings recommendation processor 1490 may generate command data that includes instructions that cause one or more devices to programmatically alter operation in accordance with the energy savings action and/or generate message data that includes a recommendation that is output to a user at the premises to recommend that the user manually alter an operation of one or more devices at the premises in accordance with the energy saving actions. The command data and/or message data may then be sent to a communication component, communication hub, and/or directly to devices at the premises 1400, as discussed above.

Figure 15:
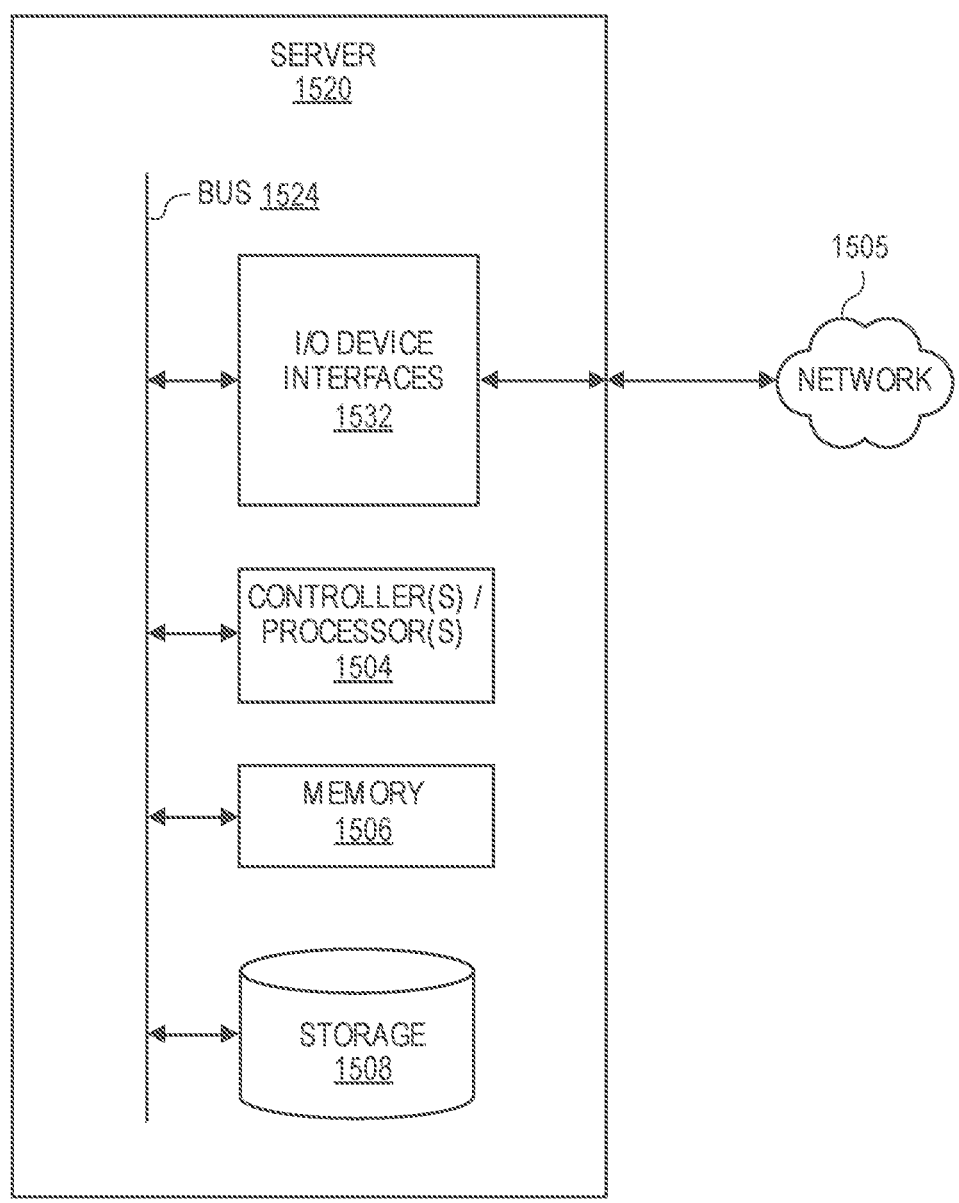
FIG. 15 illustrates example components of a server, in accordance with described implementations.

FIG. 15 is a block diagram conceptually illustrating example components of a remote device, such as a remote server 1520 that may assist with command processing and/or operation of the management system. In operation, the server 1520 may include computer-readable and computer-executable instructions that reside on the server 1520, as will be discussed further below.

The server 1520 may include one or more controllers/processors 1504, that may include a central processing unit (CPU) for processing data and computer-readable instructions, and a memory 1506 for storing data and instructions of the respective device. The memories 1506 may individually include volatile random-access memory (RAM), non-volatile read only memory (ROM), non-volatile magnetoresistive (MRAM) and/or other types of memory. The server 1520 may also include a data storage component 1508, for storing data and controller/processor-executable instructions. The data storage component 1508 may include one or more non-volatile storage types such as magnetic storage, optical storage, solid-state storage, etc. The server 1520 may also be connected to removable or external non-volatile memory and/or storage (such as a removable memory card, memory key drive, networked storage, etc.) through an input/output device interface 1532.

Computer instructions for operating the server 1520 and its various components may be executed by the controller(s)/processor(s) 1504, using the memory 1506 as temporary "working" storage at runtime. The server's 1520 computer instructions may be stored in a non-transitory manner in non-volatile memory 1506, storage 1508, or an external device(s). Alternatively, some or all of the executable instructions may be embedded in hardware or firmware on the respective device in addition to or instead of software.

The server 1520 may also include input/output device interfaces 1532. A variety of components may be connected through the input/output device interfaces. Additionally, the server 1520 may include an address/data bus 1524 for conveying data among components of the server 1520. Each component within the server 1520 may also be directly connected to other components in addition to (or instead of) being connected to other components across the bus 1524.

The server 1520 may wirelessly communicate with and receive voltage signature data and/or voltage data from premises and/or provide instructions to devices within the premises and/or receive data from the devices. Any form of wired and/or wireless communication may be utilized to facilitate communication between the server 1520, plug-in energy sensors, communication hubs, communication components, and/or devices. For example, any one or more of 802.15.4 (ZIGBEE), 802.11 (WI-FI), 802.16 (WiMAX), BLUETOOTH, Z-WAVE, near field communication ("NFC"), etc., may be used to communicate between the server 1520 and one or more plug-in energy sensors, communication components, communication hubs, and/or devices.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers, communications, energy management, and speech processing should recognize that components and process steps described herein may be interchangeable with other components or steps, or combinations of components or steps, and still achieve the benefits and advantages of the present disclosure. Moreover, it should be apparent to one skilled in the art that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage media may be implemented by a volatile computer memory, non-volatile computer memory, hard drive, solid-state memory, flash drive, removable disk and/or other media. In addition, components of one or more of the components and engines may be implemented in firmware or hardware.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly" or "substantially" as used herein, represent a value, amount, or characteristic close to the stated value, amount, or characteristic that still performs a desired function or achieves a desired result. For example, the terms "about," "approximately," "generally," "nearly" or "substantially" may refer to an amount that is within less than 10% of, within less than 5% of, within less than 1% of, within less than 0.1% of, and within less than 0.01% of the stated amount.

Although the invention has been described and illustrated with respect to illustrative implementations thereof, the foregoing and various other additions and omissions may be made therein and thereto without departing from the spirit and scope of the present disclosure.

What is claimed is:

1. A synchronous voltage signature data collection apparatus, comprising:
    a first voltage data acquisition component chain ("first VDA component chain") including:
        a first analog front end operable to sample a first analog voltage from a first channel;
        a first programmable gain amplifier ("PGA") coupled to the first analog front end and operable to at least detect a first polarity of the first analog voltage or swap a polarity value of the first polarity; and
        a first analog to digital converter ("first ADC") operable to convert the first analog voltage to a first digital voltage data sample;
    a second voltage data acquisition component chain ("second VDA component chain") including:
        a second analog front end operable to sample a second analog voltage from a second channel;
        a second PGA coupled to the second analog front end and operable to at least detect a second polarity of the second analog voltage or swap a second polarity value of the second polarity; and
        a second analog to digital converter ("second ADC") operable to convert the second analog voltage to a second digital voltage data sample;
    a field programmable gate array ("FPGA") coupled to at least the first VDA component chain and the second VDA component chain, wherein the FPGA is operable to at least:
        cause, at a first time, the first VDA component chain to sample the first analog voltage and produce the first digital voltage data sample;
        cause, at the first time, the second VDA component chain to sample the second analog voltage and produce the second digital voltage data sample;
        receive the first digital voltage data sample from the first VDA component chain and the second digital voltage data sample from the second VDA component chain; and
        provide the first digital voltage data sample and the second digital voltage data sample to a system on chip ("SoC"); and
    the SoC coupled to the FPGA and operable to at least:
        receive, from the FPGA, the first digital voltage data sample and the second digital voltage data sample; and
        process the first digital voltage data sample and the second digital voltage data sample to determine a voltage data signature indicative of a device operation; and wherein:
upon an activation of the synchronous voltage signature data collection apparatus:
the first PGA is operable to at least set a first gain of the first PGA to a first gain value;
the second PGA is operable to at least set a second gain of the second PGA to the first gain value; and
the SoC is further configured to at least:
subsequent to the first gain of the first PGA being set to the first gain value, receive a third voltage data sample generated by the first VDA component chain at a second time that is prior to the first time and in response to the activation;
subsequent to the second gain of the second PGA being set to the first gain value, receive a fourth voltage data sample generated by the second VDA component chain at the second time;
determine that the third voltage data sample has a higher voltage value than the fourth voltage data sample; and
in response to determining that the third voltage data sample has the higher voltage value, set the second gain of the second PGA to a second gain value that is approximately a multiple of the first gain value.

2. The synchronous voltage signature data collection apparatus of claim 1, wherein the coupling between the FPGA and the first VDA component chain and the second VDA component chain includes:
a chip select line between the FPGA, the first VDA component chain and the second VDA component chain, wherein the first VDA component chain is configured to sample the first analog voltage and the second VDA component chain is configured to sample the second analog voltage in response to a signal sent from the FPGA via the chip select line.

3. The synchronous voltage signature data collection apparatus of claim 1, wherein the coupling between the FPGA and the first VDA component chain and the second VDA component chain includes:
a first direct connection between the first VDA component chain and the FPGA to transmit the first digital voltage data sample between the first VDA component chain and the FPGA; and
a second direct connection between the second VDA component chain and the FPGA to transmit the second digital voltage data sample between the second VDA component chain and the FPGA.

4. The synchronous voltage signature data collection apparatus of claim 1, wherein:
the first VDA component chain is configured to sample at a rate of at least two mega-samples per second; and
the second VDA component chain is configured to sample at the rate of at least two mega-samples per second.

5. The synchronous voltage signature data collection apparatus of claim 1, wherein:
the first digital voltage data sample is at least a 14-bit sample; and
the second digital voltage data sample is at least a 14-bit sample.

6. The synchronous voltage signature data collection apparatus of claim 1, further comprising:
a power distribution unit that provides a reference voltage to the first PGA.

7. The synchronous voltage signature data collection apparatus of claim 1, wherein at least one of the first VDA component chain or the second VDA component chain further includes:
a high pass filter that includes at least one capacitor and at least one resistor, wherein first values of the at least one capacitor and second values of the at least one resistor are set to determine a cutoff frequency for the high pass filter.

8. The synchronous voltage signature data collection apparatus of claim 7, wherein:
a first capacitor of the at least one capacitor has a first value of approximately 150 picofarads;
a first resistor of the at least one resistor has a second value of approximately 750,000 Ohms;
a second resistor of the at least one resistor has a third value of approximately 150,000 Ohms; and
the cutoff frequency is approximately 1.2 kilohertz.

9. An apparatus, comprising:
a plurality of voltage data acquisition ("VDA") component chains, each of the plurality of VDA component chains including:
an analog front end operable to sample an analog voltage from a channel of a plurality of channels;
a programmable gain amplifier ("PGA") coupled to the analog front end and operable to at least detect a polarity of the analog voltage or swap a polarity value of the polarity; and
an analog to digital converter ("ADC") configured to at least:
convert the analog voltage to a digital voltage data sample;
a field programmable gate array ("FPGA") coupled to each of the plurality of VDA component chains and configured to at least:
send an instruction that causes each of the plurality of VDA component chains to sample, at a first time, the respective analog voltage;
receive, from each of the plurality of VDA component chains, the digital voltage data sample; and
provide each of the digital voltage data samples to a system on chip ("SoC"); and
the SoC coupled to the FPGA and configured to at least:
receive, from the FPGA, each of the digital voltage data samples; and
process the digital voltage data samples to determine a voltage signature indicative of a device operation; and wherein:
upon an activation of the apparatus:
a first PGA of a first VDA component chain of the plurality of VDA component chains is operable to at least set a first gain of the first PGA to a first gain value;
a second PGA of a second VDA component chain of the plurality of VDA component chains is operable to at least set a second gain of the second PGA to the first gain value; and
the SoC is further configured to at least:
subsequent to the first gain of the first PGA being set to the first gain value, receive a third voltage data sample generated by the first VDA component chain at a second time that is prior to the first time and in response to the activation;
subsequent to the second gain of the second PGA being set to the first gain value, receive a fourth voltage data sample generated by the second VDA component chain at the second time;

determine that the third voltage data sample has a higher voltage value than the fourth voltage data sample; and in response to determining that the third voltage data sample has the higher voltage value, set the second gain of the second PGA to a second gain value that is approximately a multiple of the first gain value.

10. The apparatus of claim 9, wherein a first analog front end of a first VDA component chain of the plurality of VDA component chains is configured to step-down a first analog voltage of the respective analog voltages to a reference analog voltage that is lower than the first analog voltage.

11. The apparatus of claim 9, wherein the coupling between the FPGA and each of the plurality of VDA component chains includes:
a first input/output ("I/O") interface of the FPGA connected to a system clock interface of each of the plurality of VDA component chains, wherein each of the plurality of VDA component chains transmit at least a bit of data from the VDA component chain to the FPGA with each clock cycle received at the system clock interface.

12. The apparatus of claim 9, wherein the coupling between the FPGA and each of the plurality of VDA component chains includes:
a first direct connection between a first input/output ("I/O") interface of the FPGA and a first data out interface of the first VDA component chain of the plurality of VDA component chains; and
a second direct connection between a second I/O interface of the FPGA and a second data out interface of the second VDA component chain of the plurality of VDA component chains.

13. The apparatus of claim 12, wherein:
in response to an input from the FPGA;
a first digital voltage data sample is sent from the first VDA component chain to the FPGA via the first direct connection; and
a second digital voltage data sample is sent from the second VDA component chain to the FPGA via the second direct connection.

14. The apparatus of claim 9, wherein a first VDA component chain of the plurality of VDA component chains includes a level shifter, wherein the level shifter is configured to at least shift a first analog voltage of the respective analog voltages to correspond with a voltage range of the first VDA component chain.

15. The apparatus of claim 9, wherein the FPGA is coupled to the SoC via a high-speed interface.

16. The apparatus of claim 9, wherein the FPGA is further configured to at least:
store each of the digital voltage data samples in a buffer;
generate a payload that includes each of the digital voltage data samples stored in the buffer; and
transmit the payload to the SoC.

17. The apparatus of claim 9, wherein:
the FPGA is further coupled to a current measurement device configured to measure a current of at least one of the respective analog voltages and provide a current data representative of the current to the FPGA.

18. An apparatus, comprising:
a plurality of voltage data acquisition component chains ("VDA component chains"), each of the plurality of VDA component chains including:
an analog front end operable to sample an input from a channel of a plurality of channels;
a programmable gain amplifier ("PGA") coupled to the analog front end and operable to at least detect a polarity of the input or swap a polarity value of the polarity;
an analog to digital converter ("ADC") configured to at least convert the input to a data sample; and
a field programmable gate array ("FPGA") coupled to each of the plurality of VDA component chains and configured to at least:
cause each of the plurality of VDA component chains to sample, at a first time, each respective input; and
receive, from each of the plurality of VDA component chains, respective data samples; and
a system on chip ("SoC") coupled to the FPGA and configured to at least:
receive, from the FPGA, the respective data samples; and
store, in a memory, the respective data samples; and
wherein:
upon an activation of the apparatus:
a first PGA of a first VDA component chain of the plurality of VDA component chains is operable to at least set a first gain of the first PGA to a first gain value;
a second PGA of a second VDA component chain of the plurality of VDA component chains is operable to at least set a second gain of the second PGA to the first gain value; and
the SoC is further configured to at least:
subsequent to the first gain of the first PGA being set to the first gain value, receive a third voltage data sample generated by the first VDA component chain at a second time that is prior to the first time and in response to the activation;
subsequent to the second gain of the second PGA being set to the first gain value, receive a fourth voltage data sample generated by the second VDA component chain at the second time;
determine that the third voltage data sample has a higher voltage value than the fourth voltage data sample; and
in response to determining that the third voltage data sample has the higher voltage value, set the second gain of the second PGA to a second gain value that is approximately a multiple of the first gain value.

19. The apparatus of claim 18, wherein:
the first VDA component chain of the plurality of VDA component chains is coupled to the FPGA via a first direct connection and provides first data samples to the FPGA via the first direct connection; and
the second VDA component chain of the plurality of VDA component chains is coupled to the FPGA via a second direct connection and provides second data samples to the FPGA via the second direct connection.

20. The apparatus of claim 18, wherein the FPGA is further configured to at least:
packetize the data samples to produce packetized data samples; and
send the packetized data samples to the SoC.

21. The apparatus of claim 18, wherein each data sample is at least a 14-bit data sample.

22. The apparatus of claim 18, wherein the apparatus is included in a plug-in energy sensor configured to measure a voltage signature of an appliance operating on an electrical circuit.

23. An apparatus, comprising:
a system on chip ("SoC") configured to at least:
- receive a first voltage data sample generated by a first voltage data acquisition component chain ("VDA component chain");
- receive a second voltage data sample generated by a second VDA component chain; and
- in response to determining that the first voltage data sample has a higher voltage value than the second voltage data sample, cause at least one of a first gain value of a first gain of the first VDA component chain or a second gain value of a second gain of the second VDA component chain to be set such that the first gain value and the second gain value are different.

24. The apparatus of claim 23, wherein the first VDA component chain includes at least:
- an analog front end operable to sample a first input from a first channel of the plurality of channels;
- a programmable gain amplifier ("PGA") coupled to the analog front end and operable to at least detect a first polarity of the first input; and
- an analog to digital converter ("ADC") configured to at least convert the first input to a first data sample.

25. The apparatus of claim 23, wherein, upon activation of the apparatus, the first VDA component chain and the second VDA component chain have a same gain value.

* * * * *